May 3, 1966 R. P. HOLLAND, JR 3,249,322
AIR TRAIN

Filed April 6, 1964 6 Sheets-Sheet 1

Raymond Prunty Holland Jr.

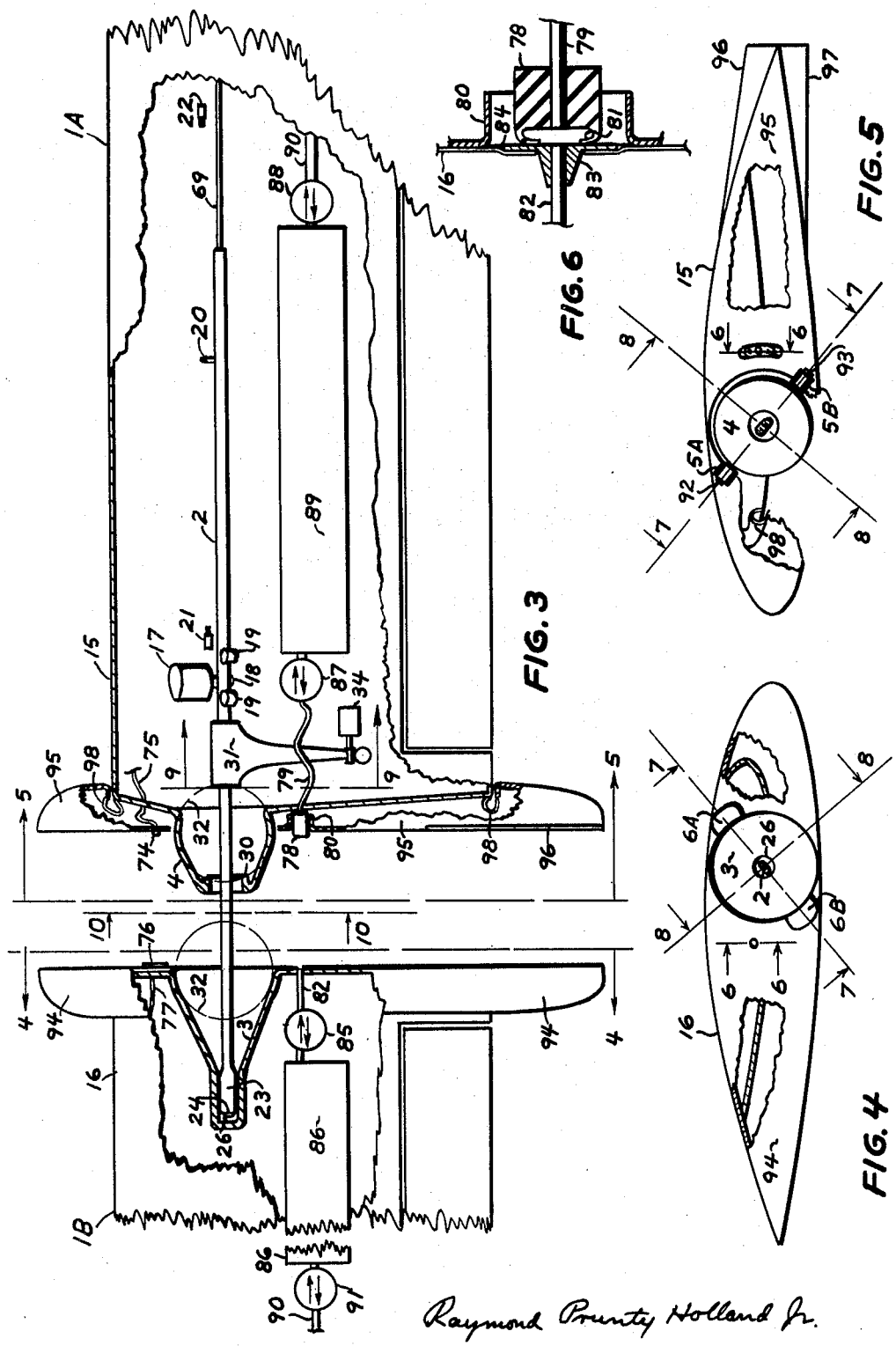

May 3, 1966  R. P. HOLLAND, JR  3,249,322
AIR TRAIN

Filed April 6, 1964  6 Sheets-Sheet 3

Raymond Prunty Holland Jr.

May 3, 1966  R. P. HOLLAND, JR  3,249,322
AIR TRAIN

Filed April 6, 1964  6 Sheets-Sheet 4

Raymond Prunty Holland Jr.

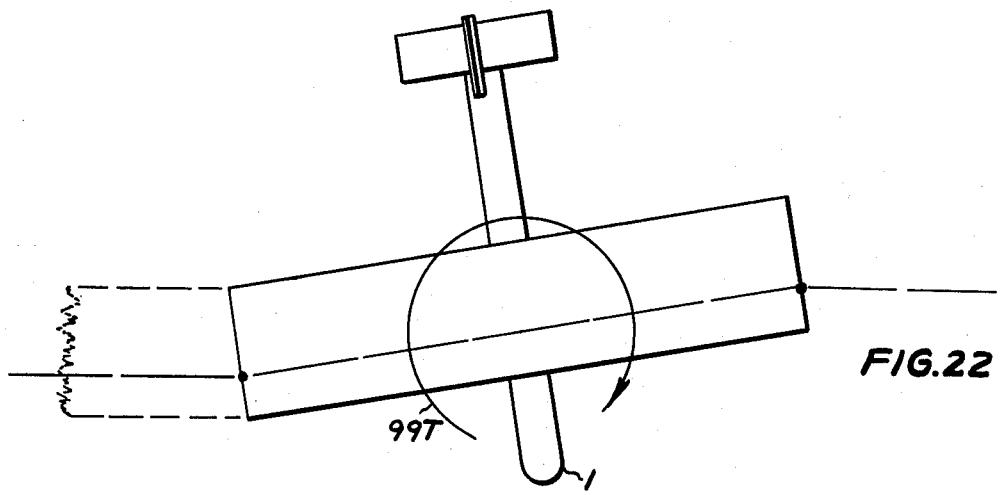
FIG. 22
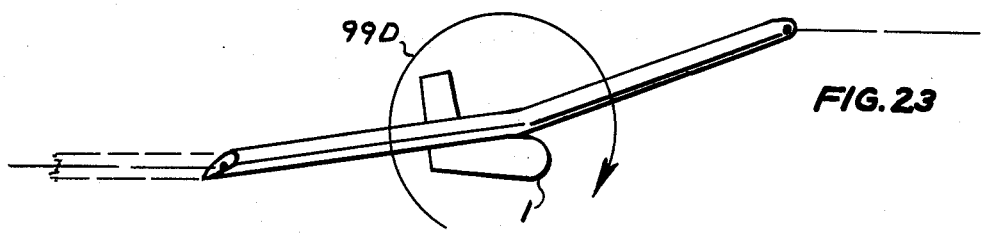
FIG. 23
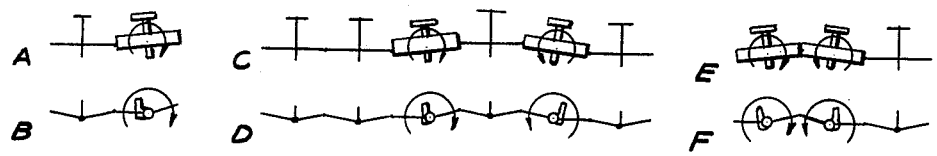
FIG. 24, A-F
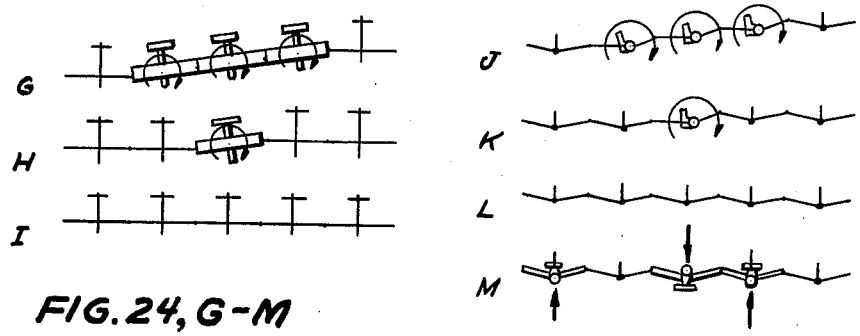
FIG. 24, G-M
Raymond Prunty Holland, Jr.

May 3, 1966 R. P. HOLLAND, JR 3,249,322
AIR TRAIN
Filed April 6, 1964 6 Sheets-Sheet 6
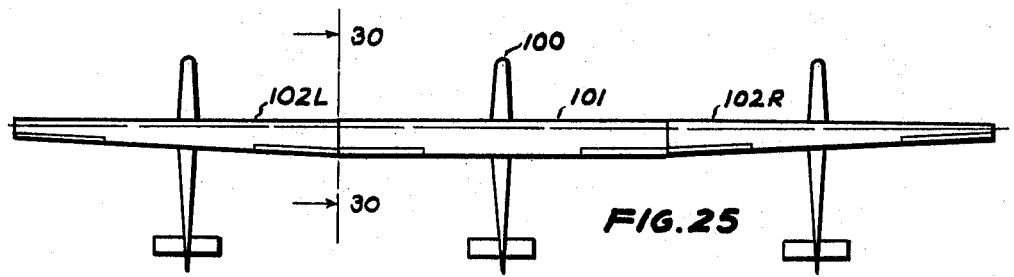
FIG. 25
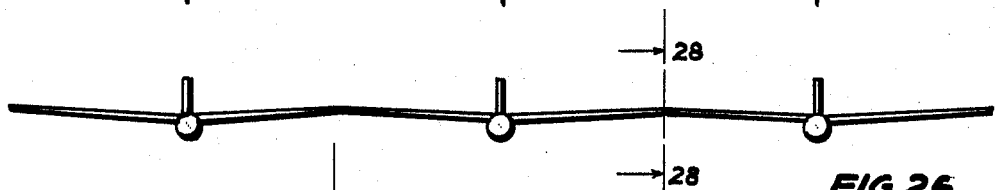
FIG. 26
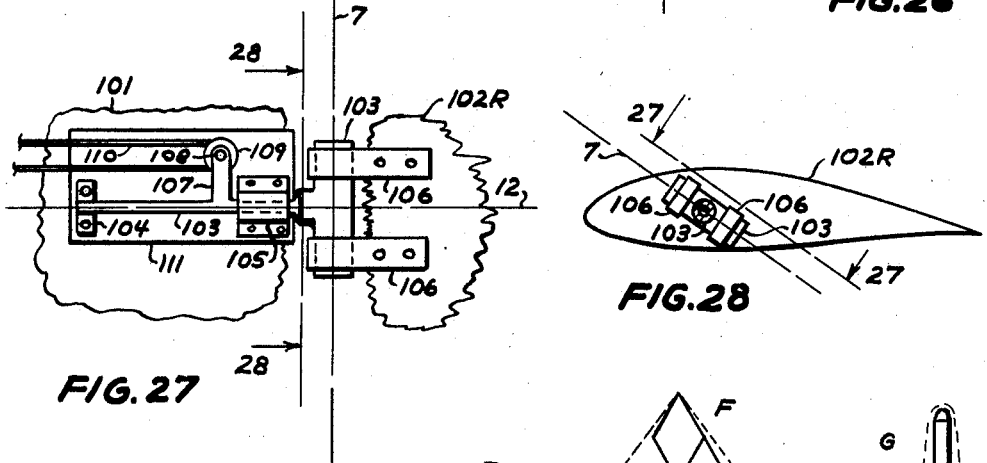
FIG. 27
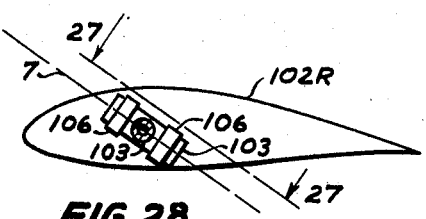
FIG. 28
FIG. 29, A-G
FIG. 30
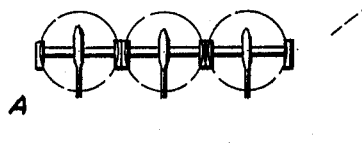
Raymond Prunty Holland Jr.

United States Patent Office 3,249,322
Patented May 3, 1966

3,249,322
AIR TRAIN
Raymond Prunty Holland, Jr., 1702 W. 3rd St.,
Roswell, N. Mex.
Filed Apr. 6, 1964, Ser. No. 357,482
26 Claims. (Cl. 244—3)

This application is a continuation-in-part of my copending application Serial No. 173,438, filed July 12, 1950.

The present invention pertains to means for forming a serially arranged train of discrete aerodynamically supported aircraft structures, each of which carries a substantial useful load, and means for trimming, stabilizing, and controlling the overall train in flight and for trimming, stabilizing, and controlling the discrete aircraft structures in the train relative to each other.

In my co-pending patent application Serial No. 173,438, filed July 12, 1950, I have shown and described my invention of the multiple span aircraft, a form of the air train, a flight structure which has great inherent aerodynamic and structural advantages.

Full scale flight experience to date with my invention of the multiple span aircraft has demonstrated the expected aerodynamic performance advantages but has been limited to the flight attachment at their wing tips of improvised airplanes of widely different designs and of markedly different sizes, having inflight engagement means employing target areas much too small for practical use in rough air, having inadequate and inappropriate means for control and stabilization, and having no provision for engagement of the individual aircraft in other than regular order, nor for lengthening the train to more than three aircraft two of which were relatively small, thereby failing to realize the major advantages of my invention. Use was not made of simple means which could have corrected all of these difficulties, some of which means are described in my previous above-identified application and others of which are described in the present application.

Objects of this invention include the following:

To provide practical means for assembling, disassembling, trimming, stabilizing, and controlling an aerodynamically and structurally efficient air train.

To reduce the areodynamic drag and heating which is caused by the necessity for aerodynamic-exposure-in-total of any aircraft in individual flight, by making that exposure less than total by producing a unified, serially arranged aircraft assemblage in which individual aircraft are sheltered aerodynamically to the maximum possible degree.

To reduce stresses and weight and to avoid destructive stresses in an aicraft construction having relatively great length between extremities.

To form a composite aircraft the size of which is readily adjustable to the size of the load to be carried.

To obtain the benefits of a very large aircraft by the use of a plurality of small aircraft, including the benefit of relatively small developmental costs and small developmental lead time.

To produce aircraft structures having a high degree of practical versatility; able to fly and compete individually and in small trains, or in long trains; able to form a train of individuals starting their flights from many different points and ending their flights at many different points; and able to transfer and convey useful load from one individual to another in flight.

To enable individual aircraft to engage each other quickly, immediately after take-off, and assemble in a unified train of any desired length; and to enable the individual aircraft to take positions in the train in any desired order, and to change that order whenever desirable.

To avoid the need for better than average piloting skill in the inflight engagement operation; to permit successful engagement to be made in the roughest air unavoidably encountered in continuous operations.

To simplify the engagement operation to the extent that it can be accomplished remotely by radio control.

To provide a large target for engagement purposes and to avoid the necessity for either close approach or precise alignment of the engaging aircraft.

To avoid the necessity for precisely timed operations during the engagement procedure; to perform the engagement operation automatically, with the pilot's attention directed entirely to the flying of his aircraft.

To avoid dangerous or otherwise undesirable changes of aircraft trim during the engagement operation; to accomplish the completion of a normal engagement operation without the application of any appreciable mechanical moment on either of the engaging aircraft.

To enable either engaging aircraft to disengage from the engagement operation quickly at any time during the operation, or at any time after the operation has been completed.

To produce corrective moments on the engaging aircraft during a disturbed or an initially misaligned engagement operation, so as to correct the misalignment and cause positive guidance to the finally engaged condition.

To avoid the transmission of unnecessary stresses across an attached joint between adjacent aircraft structures, to restrict the angular displacement across the joint to moderate angles in combined yaw and roll, to resist progressively the increase of these angles of combined yaw and roll, and to avoid the transmission of destructive stresses across the joint.

To stabilize and trim the individual aircraft structures relative to the other aircraft structures in the train.

To eliminate any tendency for individual aircraft structures in an air train to fold together back to back.

To stabilize, trim, and control the overall train in all normal flight conditions, attitudes, and maneuvers.

To achieve unusually smooth riding qualities in choppy air.

To accomplish the four objects next above without resorting to the use of elaborate or complex control systems or unusual piloting techniques.

To permit the conveyance of fuel and other useful load across the joints in the train, to enable the local weight in the train to be balanced against the local aerodynamic lift with the train trimmed for the least aerodynamic drag, and to permit aerial fueling from the extreme ends of the train to achieve airborne gross weights greatly in excess of feasible take-off weights.

To permit the transfer of electric power and other power and communication means across joints throughout the train.

To permit the train to be flown, and serviced as necessary in flight, with a minimum crew, using communication and passage of personnel and equipment across the joints of the train.

To achieve multiengine reliability; to be able to maintain the flight of non-powered or disabled aircraft.

To reduce the aerodynamic gap between the adjacent aircraft structures of the train, to reduce aerodynamic drag and yet permit relative motions between adjacent aircraft structures, without resorting the elaborate cowling with many moving pieces.

To produce individual aircraft structures for the train which, when flown as individual aircraft, are efficient short range load carriers by virtue of compact design and light weight structure.

To obtain an aerodynamic end plate effect at the wing tips of the individual aircraft structures, which, when engaged together, compose the train.

My invention is shown in the drawing, consisting of thirty figures.

FIGURE 1 is a perspective view from beneath and to one side showing one specific embodiment of the invention, an air train consisting of four turbo-fan powered subsonic cargo airplanes, with a fifth airplane shown in the act of attaching to the train at its right wing tip, with portions of the left wing tip of the fifth airplane broken away to reveal portions of the winding tip mechanism, including parts which produce a determinate forwardly and upwardly sloping bend axis in the joint between airplanes. The train is not limited to five aircraft. Any number may attach, and they may take positions in any order.

FIGURE 2 is a side view diagram at a typical internal joint in the train showing the relative positions of the joint between airplanes, the forward and upward sloping bend axis of the joint between airplanes, the aerodynamic center of the vertical tail surfaces, and the center of gravity of the next adjacent airplane. The presence of dihedral angle in the wing is also indicated.

FIGURE 3 is a plan view showing the wing tips of two airplanes in the act of attachment with much of the upper surface of the wings removed to disclose the attachment cone and the attachment dome in section, the engagement rod and its automatic cyclical drive mechanism, the rod clamp, the wing tip housings (the one on the right being pivotally mounted), the fuel tanks, and the interplane fuel lines and electrical connections.

FIGURE 4 is a view taken at section 4—4 of FIGURE 3 showing the engagement rod in section, and the end view of the right wing tip of the left hand airplane, including the attachment target cone, the bearing pads for the slopping bend axis, the rigid wing tip housing, and the fuel transfer hose, with the wing structure visible in section where portions of the tip housing are removed.

FIGURE 5 is a view at section 5—5 of FIGURE 3 showing the end view of the left wing tip of the right hand airplane, including the attachment dome, the bearing rollers for the sloping bend axis, the pivotally mounted gap-closing tip housing with its gap-closing fins and its aerodynamic seals, and the fuel transfer fitting.

FIGURE 6 is a view at section 6—6 of FIGURE 4 shown together with a view at section 6—6 of FIGURE 5 as these sections appear when the two airplanes are fully attached, showing the fuel transfer hose and fitting.

Figure 7:
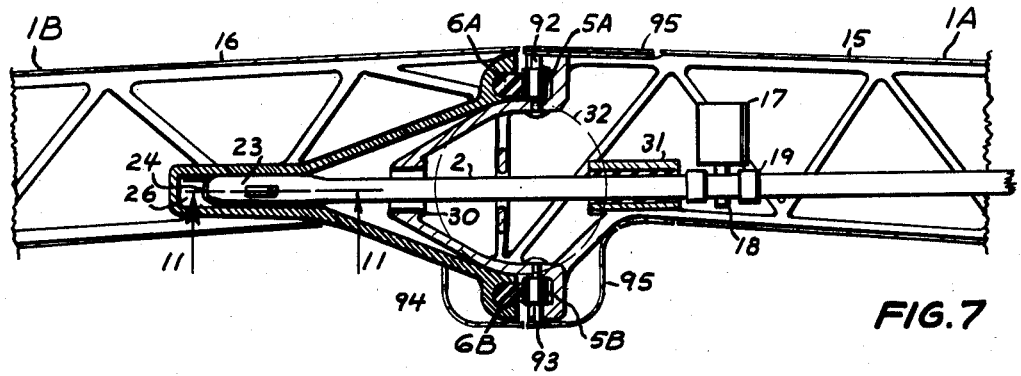

FIGURE 7 is a view at section 7—7 of FIGURE 4 and section 7—7 of FIGURE 5 as these appear when the two airplanes are fully attached, showing stiff structural means consisting of relatively stiff stress-transmitting structure including cone 3, dome 4, pads 6A and 6B, rollers 5A and 5B, and engagement rod 2 (edgewise) stressed in tension holding these parts snugly together, producing comparatively great rigidity in the plane of the forwardly and upwardly sloping bend axis (axis 7) in the joint between planes. This stiff structural geometric plane in this figure lies parallel to the plane of the paper. Also shown are other parts which lie in the stiff plane, the clamp which holds the engagement rod, and the cyclical rod-extending and rod-retracting motor.

Figure 8:
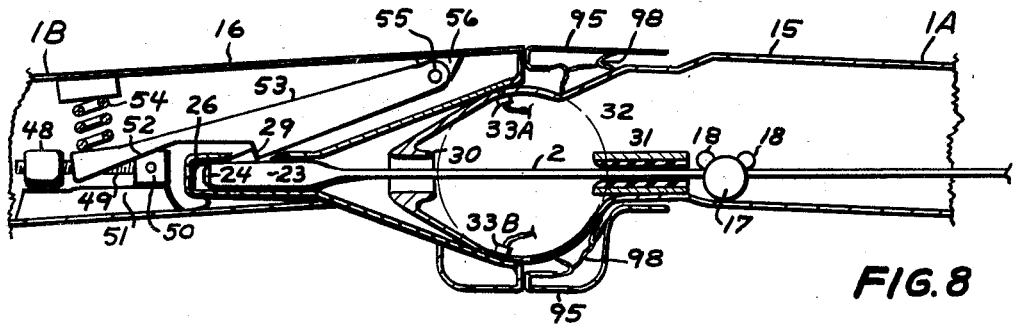

FIGURE 8 is a partial view of sections 8—8 of FIGURES 4 and 5, as these sections appear when the two airplanes are fully attached, showing the rotatable ball-and-socket construction of the attachment dome mating in the attachment cone, producing axis 7, a determinate axis of combined yawing and rolling rotation in the joint. This axis in this view lies perpendicular to the plane of the paper. FIGURE 8 also shows the engagement rod with its head latched in a releasable latching mechanism in the wing tip shown on the left, and it shows the movable gap-closing wing tip housing and its aerodynamic seals on the wing shown on the right, and the rod extension, retraction, and holding mechanism in the wing tip on the right.

FIGURES 7 and 8 also show that the wings of the individual airplanes have dihedral angle, a negative dihedral angle being visible at the joint between wing tips.

FIGURES 4, 5, 7, and 8, taken together show the construction of a determinate spanwise axis of rotation through the joined tips, which permits freedom for adjacent airplanes to pitch relative to each other, but which does not permit relative roll or yaw except as they occur in combination around axis 7. The bearing rollers on the wing tip shown on the right roll or slide on the bearing pads on the squared off end of the wing tip shown on the left, and the dome on the right slides in rotation with the joining cone on the left wing, around the engagement rod as an axis. This motion may occur with the two tips aligned in a variety of angular positions. These positions would be visible as various angles of diheral if viewed as in FIGURE 8.

Figure 9:
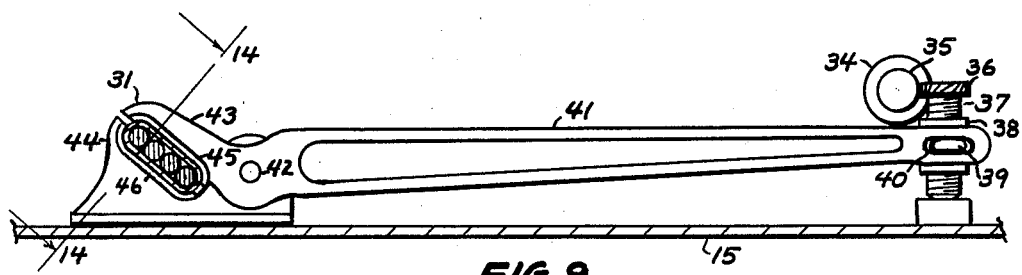

FIGURE 9 is a view at section 9—9 of FIGURE 3 showing the clamp mechanism which holds the engagement rod when the joint is fully formed and thereby holds adjacent aircraft joined together. A fuel line is omitted for clarity.

Figure 10:
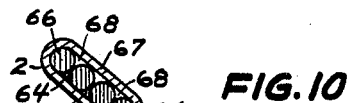

FIGURE 10 is a diagrammatic view at section 10—10 of FIGURE 3 representing the sloping, flat, stiffly flexible, sheathed spring construction of the engagement rod and the electrical wiring imbedded in it.

Figures 11, 12, 13:
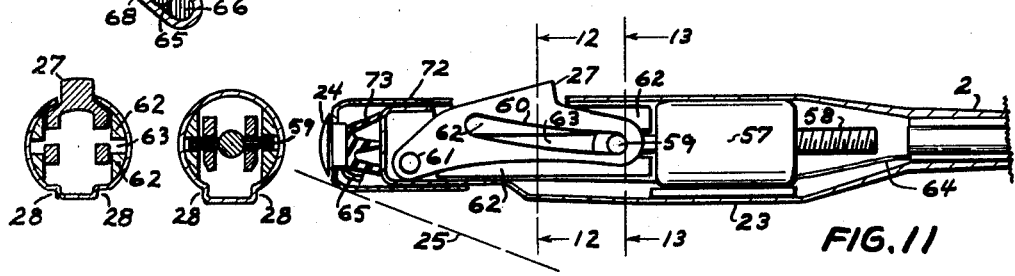

FIGURE 11 is a view at section 11—11 of FIGURE 7 showing the mechanism in the head of the engagement rod for releasing the engagement latch to release the joint between airplanes, and the resiliently mounted microswitch at the tip of the head for actuating the mechanism which stops the extension of the rod and starts the retraction of the rod. FIGURES 12 and 13 are views at sections 12—12 and 13—13 respectively of FIGURE 11 showing the mechanism in the rod head for raising and lowering the engagement latch.

Figure 14:
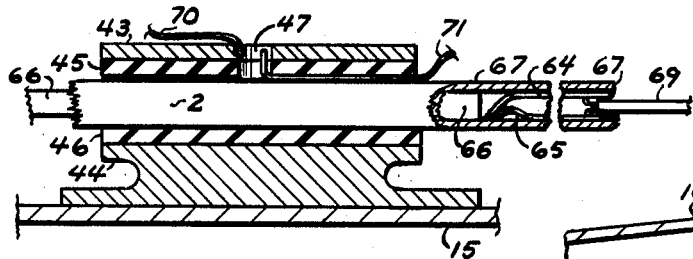

FIGURE 14 is a view at section 14—14 of FIGURE 9 showing the stiffly resilient structure at the rod-holding clamp and a switch operated by resilient deflection of the rod-clamping jaw material when extreme tensile loads exist in the rod. Electrical wiring and contacts within the attachment rod are also indicated.

In FIGURES 1 through 14 some elements of construction are shown in exaggerated size, and some are omitted in some views and are shown in others, for purposes of clarity: In FIGURE 3 the internal wing structure is omitted and most of the parts of the invention are shown relatively enlarged but the fuel tanks are shown relatively small. In FIGURE 8 the internal beam structure of FIGURE 7, which would appear edgewise in FIGURE 8, is omitted. In FIGURE 9 this same beam structure and the interaircraft fuel conveyance line are omitted.

Figure 15:
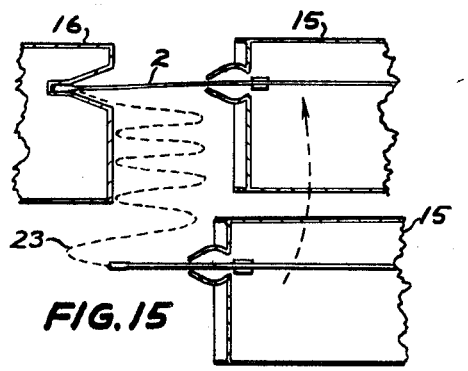

FIGURE 15 is a diagrammatic representation in plan view of two wing tips coming abreast in the engagement operation, showing the reciprocating action of the engagement rod as it probes for and finds the target cone and becomes engaged in it.

Figure 16:
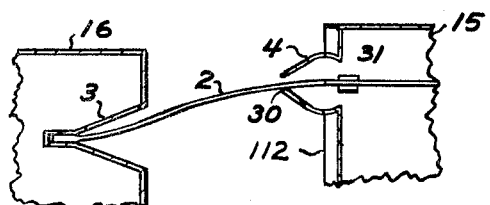
Figure 17:
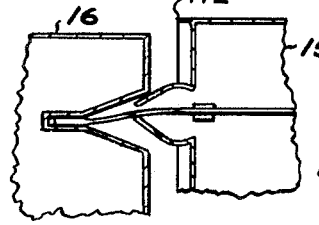
Figure 18:
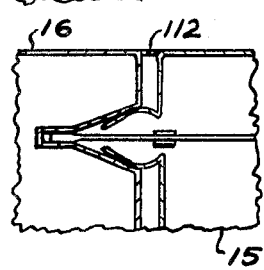

FIGURES 16, 17, and 18 are plan view diagrams showing the guiding and forcing actions of the engagement rod, the guiding attachment dome, and the attachment target guiding cone as the engagement rod is retracted and the two wing tips are brought into alignment.

Figure 19:
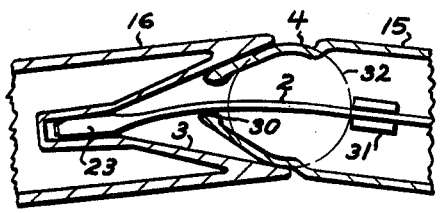

FIGURE 19 is a diagrammatic section through the fully attached joint between airplanes, with the joint deflected to its maximum angle, showing the lip of the attachment dome bearing on the engagement rod and bending it, and the cone-shaped outer portion of the attachment dome bearing solidly against the inner surface of the attachment cone, preventing further angular displacement of the joint.

Figure 20:
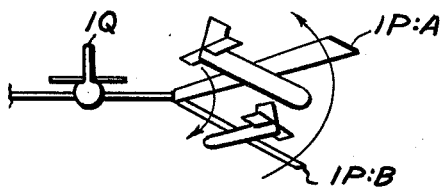

FIGURE 20 is a diagram illustrating one of the two modes of motion permitted by the joints between airplanes, namely determinate rotation around axis 7, an upwardly forwardly sloping axis. This motion is greatly exaggerated in this and succeeding diagrams.

Figure 21:
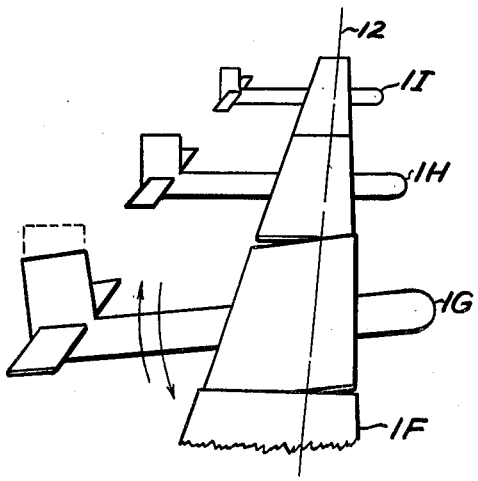

FIGURE 21 is a diagram illustrating the other mode of motion permitted by the joints between airplanes, namely determinate rotation around axis 12, a horizontal axis perpendicular to the flight direction.

FIGURES 22 and 23 are general illustrative diagrams in plan view and front view respectively of any airplane in the train which becomes disturbed in yaw or in roll relative to the forward moving line of the train, indicating the corrective aerodynamic couples due to axis 7 which always act together in either such case.

FIGURE 24, A through L, shows a variety of specific examples of group stabilization in response to the general actions of axis 7 as in FIGURES 22 and 23. FIGURE 24M shows response to the action of axis 12 as in FIGURE 21. The curved arrows in FIGURES 24A, B, C, D, E, F, G, H, J, and K represent disturbance-correcting couples. The straight arrows in FIGURE 24M represent disturbance-producing gusts.

FIGURE 25 is a plan view of a special purpose aircraft of high aspect ratio, suitable for use as a three place sailplane, incorporating the joint motions of FIGURES 20 and 21, composed of three rigid, discrete aircraft structures, each supporting substantially its own weight when flying, joined together before takeoff. FIGURE 26 is a rear view of the aircraft shown in FIGURE 25. FIGURE 27 is a plan view of an internally mounted T joint between two adjacent aircraft structures in the aircraft of FIGURES 25 and 26, taken at view 27—27 on FIGURE 28, with surrounding structure broken away to show the two determinate axes of relative rotation in the joint, one extending horizontally perpendicular to the flight direction and the other extending forwardly and upwardly. FIGURE 28 is a view taken at section 28—28 of FIGURE 26. The location of this view is also shown on FIGURE 27 at section 28—28. FIGURE 28 shows the upwardly forwardly sloping orientation of one of the two axes of relative rotation. FIGURE 30, a view at 30—30 of FIGURE 25 shows a rigidly mounted short spring steel strap joint construction, which although substantially rigid, accomplishes the two axes of relative rotation through the small angles of structural deformation which actually occur and which are sufficient to operate the invention.

FIGURE 29, A through G, shows plan view segments of variously arranged serially attached air trains composed of several varieties of discrete aircraft structures, based on the same principles as the embodiments described here in detail, each arranged to shelter the individual aircraft against dissipation thereon of the predominately harmful form of aerodynamic energy, at successively increasing flight speeds. Flight direction is always vertically toward the top of the sheet. Shock cones are indicated by dotted lines in FIGURES 29E, G, and F.

FIGURE 29A shows helicopters attached serially with the length of the train lateral to the flight direction, solely to reduce induced drag—that is, not intended to reduce any other form of aerodynamic drag—for example to increase flight range for ferrying purposes.

FIGURE 29B shows a train of subsonic airplanes, also with the length of the train lateral to the flight direction to reduce induced drag, as in the specific embodiments shown in FIGURES 1 through 28.

FIGURE 29C is a train of serially attached subsonic airplanes designed to permit the train and its individual airplanes to be in a yawed attitude in normal flight, so that the length of the train has a moderate angle of sweep, to permit efficient flight to higher Mach numbers, avoiding induced drag and shock drag.

FIGURE 29D is a train of individually transonic or supersonic airplanes, with the length of the train not swept, but with the sweep of the wings of the individual aircraft structures allowing efficient flight by the train at higher Mach numbers than in the case of FIGURE 29B, avoiding induced drag and shock drag.

FIGURE 29E is a supersonic air train composed of individual aircraft structures of supersonic design, having its length dimension in a strongly swept position, obtaining sheltering from induced drag, and obtaining sheltering from shock drag by being joined and swept behind the shock cone (also technically known as the Mach cone).

FIGURE 29F is a supersonic air train composed of individually supersonic aircraft, its length being highly swept, retaining sheltering from induced drag by means of its joined sides and the fact that it has a substantial lateral dimension lying entirely within the Mach cone, with sheltering from shock drag as described for FIGURE 29E, but to a higher Mach number by virtue of its greater sweep angle, and in addition being sheltered from friction drag and aerodynamic heating by means of the orientation of the surface area on the more rearward aircraft structures, lying downwind and in the frictional wake of the more forward aircraft structures.

FIGURE 29G shows a serially attached air train for use at the highest speeds, at which aerodynamic heating, shock drag, and frictional drag are of predominant importance, having its length directly in the flight direction, with all rearward-lying aircraft structures sheltered against heating, shock drag, and frictional drag by the leading aircraft structure.

The word "length" as used above and throughout this specification means "the longest straight line that can be drawn through the train." "Lengthwise" is used in the same sense. This is a more general term than "spanwise," which is measured horizontally, transverse to the flight direction. The word "serially," so far as its directional sense is concerned, applies along the lengthwise direction, regardless of whether transverse to the flight direction, angling to the flight direction, or parallel to the flight direction.

Only the side to side free tips of a train or of an individual aircraft are not sheltered against induced drag, and only the fore and aft free tips of an adequately swept train or of an adequately swept individual aircraft are not sheltered against shock drag. Consequently when N aircraft (N representing any positive whole number) are formed into a train of appropriate orientation, the average induced drag per plane is reduced to approximately $1/N$ and the average shock drag per plane is reduced to approximately $1/N$. If four airplanes are joined the induced drag is reduced to ¼ and the shock drag is reduced to ¼, approximately. Only the leading surfaces of a train or of an individual aircraft are not sheltered from frictional drag and aerodynamic heating. The degree of benefit to the sheltered rearward surfaces is substantial but is not expressible by a simple mathematical ratio.

The operation of specific embodiments of the invention is described below in detail.

Figure 1:
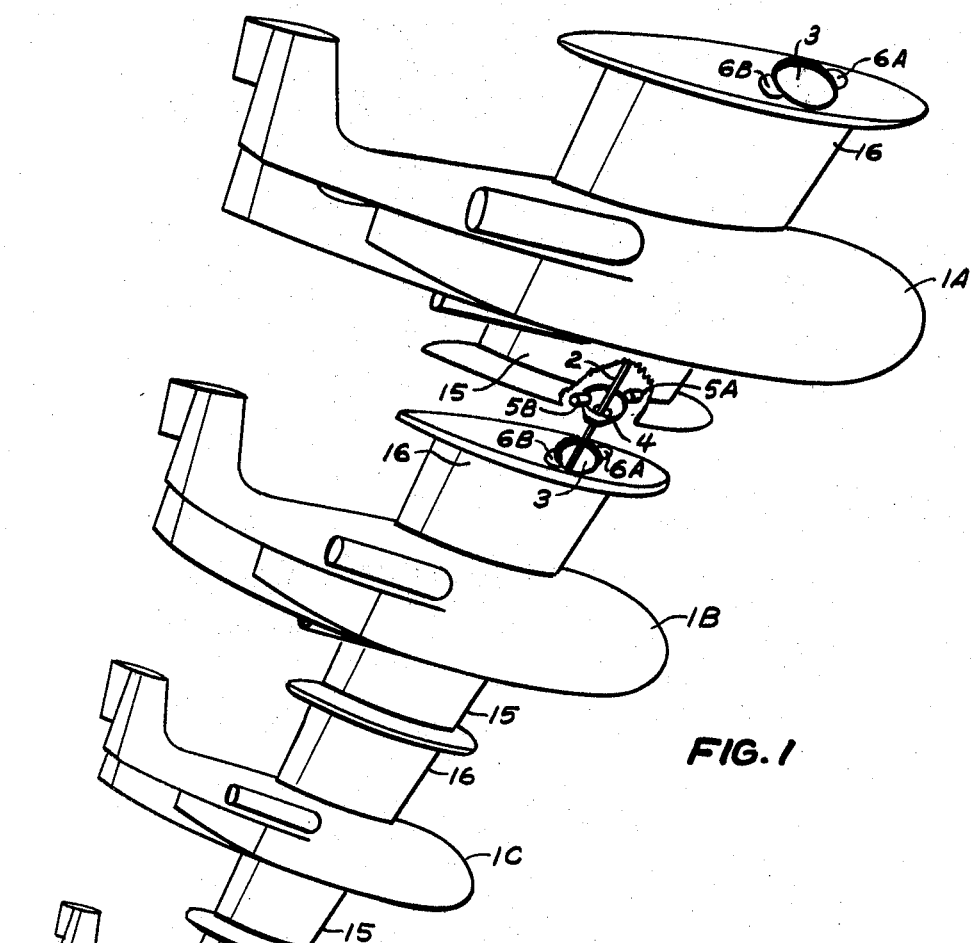

In FIGURE 1 four units of individual subsonic airplane 1, each of which is capable of independent flight, have previously engaged at their wing tips to form an aerial train, and the fifth unit of airplane 1 is in the process of engaging, being drawn toward the right hand end of the train by engagement rod 2.

The airplanes in the train are designated as follows: Airplane 1A is at the extreme right in the act of engaging. Airplane 1B is the airplane to which airplane 1A is engaging. Airplanes 1C, 1D, and 1E are other airplanes previously attached. All airplanes 1 are substantially identical; the designations A, B, C, D, E, and so on designate only the relative positions of the airplanes. A "train" exists when only airplanes 1A and 1B are engaged, and the descriptions of the engagement process apply irrespective to the presence of airplanes 1C, 1D, and 1E.

All aircraft in the train have engagement mechanisms in both wing tips. There is an active mechanism in all left wing tips 15, all alike, and a passive mechanism in all right wing tips 16, all alike. Any left wing tip 15 is capable of joining in flight to any right wing tip 16. Any aircraft can occupy any position in the train. Any number of airplanes can attach in one train, and airplanes can switch from one train to another, attaching at either free tip.

Airplanes 1A, 1B, 1C, 1D and 1E take off individually, attach in flight and detach again before landing, avoiding the prohibitive problems of a very long span aircraft on the ground.

When airplane 1A is flying independently, lifting air pressure escapes around wing tips 15 and 16, both being unsheltered, and produces upwash there, by aerodynamic actions well understood through three dimensional wing theory. As the left wing tip 15 of airplane 1A approaches the right wing tip 16 of airplane 1B for attachment lifting pressure on both these wing tips builds up progressively, as the escaping upwash between the two tips is progressively shut off. This action produces additional lift, reduces the angle of attack required to sustain flight and theory markedly reduces aerodynamic drag. The induced drag of an entire train, no matter how long that train may be, is the same approximately as the induced drag of one individual airplane detached from that train and flying alone. When two individual planes join, the induced drag per plane is reduced to about one-half; when ten planes join it is reduced to about one-tenth. In a conventional subsonic cargo airplane flown in a manner to obtain maximum fuel mileage, induced drag is about one-half of the total drag of the airplane. On airplanes having boundary layer control to reduce drag due to air friction, induced drag may be as much as nine-tenths of the total drag of the airplane. The present invention reduces induced drag almost to insignificance, so that spectacular improvements of airplane performance may be realized.

In the design of a conventional airplane, the structural bending moments, and hence the structural weight per unit span, increase disproportionately as the span of the airplane increases. That is to say, a conventional short span airplane can be constructed much lighter than a conventional long span airplane having the same wing area. In contrast, the structural weight per unit span of an air train does not increase at all no matter how long the span becomes, always remaining the same low value as that of the individual airplane of which the train is composed. The air train in this way combines strong aerodynamic and structural advantages.

With an air train, as compared to conventional individual aircraft, typically, maximum flight ranges can be more than doubled, maximum endurance can be increased three fold or four fold, maximum altitude can be increased several miles, payload can be increased at all ranges, being tripled on a three thousand mile flight, and increased one hundred fold on a six thousand mile flight. Practical flights with substantial payloads can be made around the earth on a great circle without fueling en route, making possible quick, massive support of military operations anywhere on earth without any dependence on foreign bases or surface transportation, and making possible the hauling of heavy freight by air in commercial competition with ocean freighters. These benefits are available by means of this invention alone, without the benefit of any other advances in the aeronautical art, using practical numbers of aircraft of conventional design in the train.

On short flights the individual units of an air train need not join to achieve cost savings, since their compact, light weight construction permits them to carry large payloads, and the cost of the fuel needed to overcome the drag due to their aerodynamic exposure is a small part of the total cost for such an operation. At moderate ranges where fuel cost and weight are more important, two aircraft are joined to reduce feul consumption. At longer ranges three or more aircraft are used, with larger numbers being employed for the greater distances. At every flight distance, a substantial improvement of load carrying economy is achieved. Individual units of the air train can be radio controlled during the take-off, engagement, release, and landing phases, enabling a small crew to fly a large train. The length of the train can be adjusted to the size of the shipment. Developmental costs and lead times are relatively small because the individual plane is relatively small. The costs of crating goods for overseas shipment and for protection against rough handling at dockside can be saved. Automobiles could be driven on board in Detroit and delivered economically non-stop to Australia, for example.

In the air train of FIGURE 1, the interaircraft joint for engaging, holding, and stabilizing airplane 1A relative to 1B (or 1B relative to 1C and so on) includes two rotational axes, one extending horizontally perpendicular to the flight direction and one extending forwardly and upwardly. This construction consists of rod 2, dome 4, and rollers 5A and 5B on wing tip 15 of airplane 1A, and cone 3 and bearing pads 6A and 6B on wing tip 16 of airplane 1B. For engaging, a slender flexible reciprocating rod, designated rod 2, extends from airplane 1A, oscillates lengthwise in a probing action and finds the inside of a target and guide cone of ample dimensions, designated cone 3, in wing tip 16, and engages a latch in the apex of that cone. The retraction of tension means consisting of rod 2 toward wing tip 15 draws the two wing tips together and holds them together, bringing together and holding together spherical mating surfaces on the inside of cone 3 and on the outside of dome 4, around which airplane 1A and 1B are able to roll, yaw and pitch through small angles relative to one another, the rolling and pitching being constrained to a particular combined motion imposed by rollers 5A and 5B, pivotally attached in rigidly fixed positions on the outside of dome 4 near an upwardly forwardly sloping diameter lying in a vertical plane through that dome, bearing respectively on pads 6A and 6B rigidly attached on the squared off end of wing tip 16 just outside the circular opening of cone 3 and rigidly attached to cone 3, the cone and the dome being rigidly attached in their respective wing tips.

This construction produces a rotationally determinate structure having two and only two axes of relative rotation, both determinate, in the interaircraft joint, one around axis 7 which slopes upwardly and forwardly through the effective center of the intercraft attachment parts and another around axis 12 which runs horizontally and spanwise (FIGURES 2 and 21) through the effective center of the interaircraft attachment parts. This effective center is the effective single attachment point of aircraft 1A and 1B; it lies at the center of the mating spherical surfaces of cone 3 and dome 4.

This construction will be seen to produce determinate positions of axes of rotation. Determinate axes are axes the positions of which are definite, fully established and clearly determined by the relative restraints and freedoms provided in the structure. Indeterminate axes, by contrast, are axes which may take practically any position whatever. For example, when aircraft 1A and aircraft 1B first engage, when rod 2 is fully extended, many different relative rotations are possible between the two aircraft, due to the flexibility of rod 2, and any axes of rotation which occur in the joint between planes are indeterminate. But when the two wing tips are drawn fully together, relative rotations are possible around only two axes (ignoring relatively very small structural deflections in the wings themselves). These axes are axes 7 and 12; they occuppy definite and determinate positions.

The control and stability objectives of the invention are accomplished by the freedoms which the interaircraft joint permits and the restraints which it imposes. Airplane 1A can always change angle of attack relative to airplane 1B, rotating in pitch on axis 12, approximately around rod 2 as an axis, with rollers 5 rolling on bearing pads 6. This pitching motion is resisted by rod 2 in torsion, these means providing flexible restraint to any degree determined in design to be desirable, ranging from effectively no restraint at all to a degree of torsional rigidity only slightly less than that of the wing from which it extends. See FIGURES 1, 3, 7, and 8. In the particular construction shown here rod 2 is slender and provides very little restraint. In other designs, flexible restraint means in torsion around axis 12 are provided by torsion rod 103 in FIGURE 27, and by short steel strap 113 in FIGURE 30.

Freedom in the interaircraft joint to permit relative rotations in pitch, as just described, is necessary to permit any airplane in the train to fly at whatever angle of attack may be necessary to adjust lift to support its own weight exactly, without imposing objectionable torsional strain on its structure, and is desirable in addition to permit individual aircraft in the train to nose up or nose down relative to their neighbors in response to local downgusts or upgusts respectively, thereby alleviating the changes of lift due to those gusts.

Airplane 1A can also rotate relatve to airplane 1B around axis 7, the upwardly and forwardly sloping line of contact of rollers 5A and 5B bearing on pads 6A and 6B, with the spherical portion of dome 4 rotating within the mating spherical portion of cone 3, restrained by rod 2 in bending.

Airplane 1A can rotate relative to airplane 1B around axis 12 or axis 7, either independently or in combination, and it can rotate in no other way, in any angular deflection of substantial magnitude.

The invention as embodied in these two axes of relative rotation is applied in FIGURE 25 to a train of three aircraft structures to form high aspect ratio aircraft 100 made up of three rigid lifting wing panels, panel 101 centrally located, panel 102L at the left, and panel 102R at the right, each panel having its own fuselage and conventional control surfaces, and each panel having dihedral angle and supporting substantially its own weight in flight. As shown in FIGURES 27 and 28, panel 101 is attached to panel 102R by means of T bar 103, which produces the two basic axes of rotation of the interaircraft joint of this invention. T bar 103 and its attaching bearings are equivalent to the construction described above but in a form for attachment on the ground before take-off instead of during flight.

T bar 103 is attached rigidly at its left end as seen in FIGURE 27 to the right tip of panel 101 by rigid fitting 104. Bearing 105 holds the leg of the T to panel 101 near the cross bar of the T and permits the leg of the T to pivot at that point, so that the T bar acts as a torsion spring aligned along spanwise axis 12. Hinge fittings 106 attached rigidly to the left tip of panel 102R co-operate with the cross bar of T bar 103 to form a hinge between panels 101 and 102R having axis 7 as its axis of rotation.

The torsion spring leg of T bar 103 serves as a stiffening beam adjacent to the joint and it permits flexibly restrained relative rotation around axis 12, thereby avoiding bending and torsional strains in the fragile structure of the wing tip. The torsional restraint around axis 12 may be omitted, or may be made elastically soft, or stiff, or rigid with adjustable mechanically irreversible relative rotation around axis 12, or provided with other suitable control or damping devices, depending on the dynamic, structural, and lateral weight trimming needs of the particular design. In the construction shown in FIGURE 27 the motion around axis 12 is restrained by an elastically stiff construction with mechanically irreversible adjustment. Lever arm 107, rigdily attached to the leg of T bar 103 near hinge fitting 105, is raised or lowered at its end opposite the leg of 103 by jack screw 108, driven by drum 109 around which is wrapped operating cable 110 which runs to the pilot's cockpit for manual control of the amount of twist in the leg of T bar 103 between fitting 104 and lever 107. The stresses produced by twisting the left end of 103 by these means are kept out of the surrounding wing tip structure by stiff mounting plate 111, which is rigidly attached to the structure of panel 101. Accordingly, the effective torsional spring is that portion of T bar 103 from lever 107 to the cross bar of the T, which is sufficient to absorb the small relative torsional motions due to gusts, and the pilot may relieve any steady torsional stresses in the effective spring portion of the T bar and in the wing structure of panels 101 and 102R by operating cable 110.

By means of this construction, the two adjacent aircraft structures, 101 and 102R may perform relative pitching displacements around asix 12, and/or they may perform relative combined rolling-and-yawing displacement around axis 7, and as required in order that the displacements be determinate, no other relative angular displacements may be performed.

The same type of joint as that shown in FIGURES 27 and 28 may attach panel 102L to the left tip of panel 101. It is immaterial which of the two joined panels is attached to the leg of the leg of the T and which is hinged to the cross bar, as the action is essentially the same in either case through moderate angles of displacement.

An air train like 100 but composed of two panels instead of three may be formed by attaching left panel 120L directly to right panel 102R. An air train composed of four or more panels instead of three may be formed by attaching one or more additional panels 101 between tip panels 102L and 102R. Or, air trains may be composed of any desired number of panels 101 attached to each other, without one or either of the tip panels 102L or 102R being present. These aircraft structures as shown would be attached together before take-off and would employ special equipment or facilities for launching and landing, but provisions for release prior to landing, and/or means for engagement in flight could be provided, as readily apparent from means described herein for these purposes.

In the air train a construction like that shown in FIGURE 30 may be used at the joints. In this construction a thin rectangular spring steel strap 113, shown here in cross section (which is also rectangular) is butted against and is rigidly affixed to the squared off end of the rigid structure of panel 101 by means of two rigid blocks 114 which are attached squarely to both strap 113 and to panel 101, with strap 113 sandwiched fixedly between them. Strap 113 is rigidly attached to the other panel 102L in the same manner. Rectangular strap 113 is thus rigidly attached at both ends, one end to panel 101 and the other end to panel 102L, with a rectangular middle portion lying unsupported between to two panels. This middle portion of 113 serves as an upwardly forwardly sloping strap-like spring member, a leaf spring, relatively free to bend around axis 7, and relatively stiff around an upward rearward sloping axis at right angles to axis 7, and relatively flexible when it is twisted, as may be caused by panels 101 and 102L taking different angles of attack. Strap 113 thereby permits relative motions to occur between the two panels around axes 7 and 12.

It is to be understood that these relative angular displacements between panels 101 and 102L, permitted by small amounts of flexing and twisting of 113, may be quite small while satisfactorily fulfilling their functions. An air train conforming to this invention may employ a joint construction which is substantially rigid and which is nearly as rigid as the wing panels which it connects. Or the joint may be completely rigid and the directionally oriented flexing may be made to occur in the primary structure of the wing. The structure of one or both of the panels adjacent to the joint may be designed by any competent structural engineer after the manner of strap 113 with small effective structural section moment of inertia around axis 7, large moment of inertia around an axis perpendicular to axis 7, and small polar moment of inertia around axis 12, to produce determinate directionally oriented stiffness and deflection qualities, deflecting around axis 7 when under the usual bending stresses and deflecting around axis 12 when under torsional stress. In such a construction the elastic moments produced between misaligned adjacent panels are statically stable and add to the aerodynamic couples described here to produce static stability between the adjacent panels. Even though the deflections are very small, the effect of axis 7 is very strong and the elastic moments assist in the process. Then the two tips of the panels may butt squarely and rigidly together, and the construction will function as described here and will come within the scope of this invention.

A construction which is loose-jointed or mechanically pivoted or hinged is not required in this invention, although a freely pinned hinge or pivot construction will perform satisfactorily.

In the air train, totally rigid construction between adjacent aircraft structures does not perform satisfactorily. Some flexibility is required for purposes of trim, control, stability, and structural weight reduction. Some relative angular freedom between adjacent aircraft structures permits properly adjusted alignment, produces aerodynamic moments which act to maintain or restore that alignment, and assures adequate aerodynamic damping against internal movements in the train and prevents flutter. It also provides reduction of stresses in the train by facilitating the balancing of local aerodynamic forces against local weight and inertia forces. A pinned joint is not necessary either for stability or to assure that bending moments across a joint are negligible.

The stability and control actions due to axes 7 and 12, independently of the details of the structure which produces these axes is shown in FIGURES 2, 20, 21, 22, 23, and 24.

Figure 2:
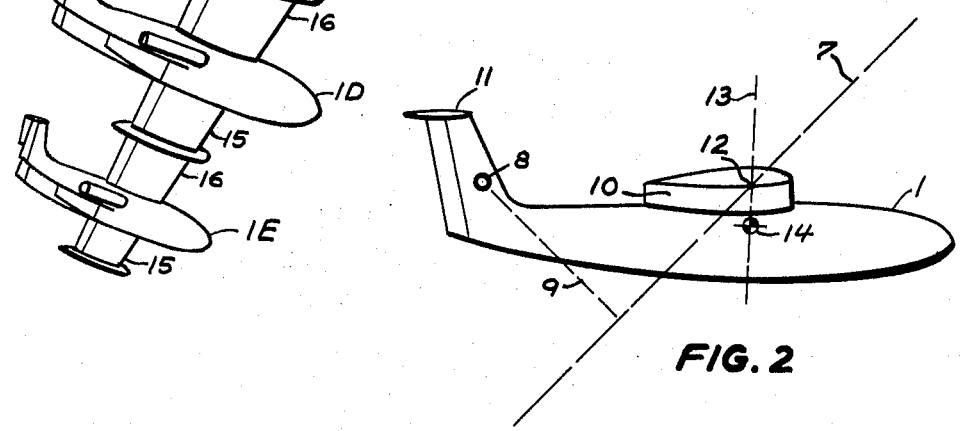

FIGURE 2 shows how the invention produces static stability aerodynamically, or structural constraint, of each individual airplane in the train about three co-ordinate axes.

An airplane moving forwardly, or to the right as seen in FIGURE 2, when rotated through small angles around axis 12, seen here in end view as a point, experiences statically stable weathervaning in a conventional way due to horizontal tail surface 11. When rotated around axis 7 (which is perpendicular to axis 12) the airplane experiences a statically stable aerodynamic moment due to the aerodynamic side force acting on the vertical tail at its aerodynamic center 8 at moment arm 9. This aerodynamic moment is statically stable in both rolling and yawing, because the motion around axis 7 combines both rolling and yawing. Motion around a third co-ordinate axis prependicular to both axes 12 and 7 is prevented by stiff structural means (see FIGURE 7) in the plane containing axis 7. In this way, even when pinned hinge or pivot joints are used for axes 7 and 12, one degree of freedom is eliminated from the possible angular motions between adjacent aircraft structures, and the position of the stiff geometric plane which is selected also has structural advantages which will be described.

The rolling moment due to conventional dihedral angle (dihedral angle being represented in FIGURE 2 by the visible lower surface 10 of the wing) acts in a statically stable direction around axis 7, in the same direction as the statically stable rolling component of the moment of the vertical tail side force around axis 7. Therefore to increase the static stability of the individual aircraft structure in the air train, any of the following are effective: Locate axis 7 more forward or lower, employ more dihedral angle, employ more vertical tail surface area, or locate the vertical tail more rearward, or higher.

Axis 12 is ordinarily located on or near a vertical plane 13 perpendicular to the flight direction (see FIGURE 2) passing through the center of gravity 14 of the next adjacent aircraft structure in the train (forwardly adjacent if the length dimension of the train is designed not perpendicular to the flight direction). Axis 7 and axis 12 need not necessarily intersect each other, nor is the position of either of these axes limited strictly to the fore and aft or vertical positions shown in FIGURE 2. Both axes may be located more forwardly to advantage on many designs, and axis 7 may be located more rearwardly without encountering critical adverse effects, but axis 12 should not be located greatly rearward of the position shown in FIGURE 2.

FIGURE 20 shows the angular motions which are possible around axis 7 between a disturbed airplane 1P, represented by the airplane at the right of FIGURE 20, shown in two greatly exaggerated angling positions 1P:A and 1P:B, and an undisturbed airplane 1Q aligned with the straight line of the train and flying straight forward and level. When the displaced wing tip of airplane 1P is elevated above the lengthwise line of the train, it must also be rearward of the lengthwise line of the train, as shown in position 1P:A; when the free wing tip lies forwardly it must also lie below the lengthwise line of the train, as shown in position 1P:B; these actions are due to the constraint imposed by axis 7. In position 1P:B the aircraft experiences a side force to the left on its vertical tail, acting in a direction to rotate the right wing tip back and up to the line of the group, and dihedral action causes an increase of lift on the right wing of this plane and a decrease of lift on the left wing, causing a rolling moment in a direction to raise the free tip from its lowered position, and in raising, due to axis 7, it must also rotate rearwardly. The same actions may be visualized in reversed directions, and with both aircraft disturbed instead of just one. They may also be visualized at either end of the train or in positions in the mid-span regions of the train. See FIGURES 22 and 23, which are plan view and front view respectively of any displaced airplane applicable to any position in the train. Rolling displacement cannot occur without yawing displacement and yawing displacement cannot occur without rolling displacement, as seen here. Regardless of whether the entire train is yawed or rolled, if any plane rolls toward its next adjacent plane it must yaw away. See 1P:A and 1Q in FIGURE 20. Likewise if any two planes yaw toward each other they must at the same time roll away from each other. See 1P:B and 1Q in FIGURE 20. In every case line-straightening aerodynamic moments act automatically, keeping all displacement small and preserving stability.

In the absence of the stabilizing actions of axes 7 and 12 an air train would not be stable, aircraft to aircraft, in roll. When one airplane rolls toward another, with wing tips joined between them, a component of the lift force acts laterally, producing a compression force across the joined tips and a rolling moment which acts in the direction to increase the angle of roll. In the absence of axis 7 this rolling moment becomes larger as the angle of roll becomes greater, producing a dangerously unstable condition, which, in an air train not employing this invention, can collapse any local restraining structure at the joined tips and can cause the two airplanes to fold over back to back, with disastrous consequences. Freedom in pitch around axis 12 combined with timely nose-down elevator action on the airplane corresponding to 1P:A in FIGURE 20 can correct this condition by reducing the lift force sufficiently. Axis 7 corrects the condition automatically without piloting attention or autopilot response, by forcing a simultaneous yawing displacement to occur, as described, bringing into action both the directional and lateral stability of airplane 1P:A in resistance against further rolling. In addition a side force develops on the yawed fuselage of airplane 1P:A in a direction opposite to the horizontal component of the lift force. These actions combine to stabilize airplane 1P:A in roll relative to any airplane 1P:Q, and to remove all risk that adjacent aircraft in a train will roll together back to back.

The air train flies at different angles of attack at different flight speeds, in a conventional way, and this causes changes in the angle of attack of axis 7, which is the angle of axis 7 relative to the flight path. Also two adjacent aircraft in a train may fly at somewhat different angles of attack and the effective angle of attack of axis 7 in the joint between these ircraft may be determined by the attitude of only one of them. These angle changes are ordinarily small as compared to the normal angle of attack of axis 7, so that the percentage change of the effective angle of attack of axis 7 due to these deviations is always without important effect on the basic actions of axis 7 as described here.

FIGURE 21 illustrates the motion of an individual airplane 1G in pitch around axis 12 relative to its neighbors 1F and 1H.

The trimming of an air train to obtain a straight lengthwise line, to reduce aerodynamic drag, and to eliminate static shear reactions at the joined tips, or to tow non-powered or disabled airplanes, is greatly facilitated by the automatic line-straightening action of axis 7 and by the convenient changes of angle of attack made possible by axis 12. Trimming is also facilitated by three-dimensional aerodynamic flow which tends to equalize lift across the mid-length region of the train. Trim occurs naturally and at once when identical planes attach to form a train. Trimming these planes for minimum drag requires that weight (usually fuel) be conveyed inboard through interaircraft passageways from the unsheltered tips.

Ailerons are relatively ineffective for trimming within the train because of spanwise blending of lift due to three dimensional flow (so that trimming by weight shifting is preferably used instead), and control of local lift along the unified wing of the train by elevator action loses some of its effectiveness due to three dimensional flow, but vertical tails are unaffected and are therefore uniquely powerful.

Local gusts lose concentration through induced three dimensional flow; some small part of the lift change due to each gust is experienced all across the entire train from tip to tip, having the effect of smoothing out and cancelling much of the effect of choppy air.

The air train is an aircraft of great physical span, large in comparison with the scale of unavoidable turbulence in the atmosphere, and possessing local adaptability to gusts and ability to fly at unusually high altitudes, so that it may well prove to be the smoothest riding of all aircraft.

The powerful effect of the vertical tail occurs through the corrective yawing couple which it produces (couple 99T in FIGURE 22). Because of the mechanical unification of roll and yaw, as described, any angular disturbance whatever always produces a powerful vertical tail action. Strong corrective yawing couples are always produced. This is true regardless of the nature of the disturbance; it does not matter whether the disturbance is due to an unbalance of thrust-minus-drag or an unbalance of lift-minus-weight, or to an unbalanced rolling moment or yawing moment.

The corrective effect of dihedral angle which occurs through couple 99D in FIGURE 23 always accompanies the correction due to the vertical tail.

Whenever a disturbance occurs internally in the train, the corrective aerodynamic couples occur simultaneously and in equal and opposite pairs, as will be seen from FIGURES 24C, D and 24E, F. Such couples in balanced pairs are ideal for internal stabilization of the train because their effects on the dynamic chain are localized and isolated. No net acceleration is impressed on the train either linearly or in rotation. There is no possibility for secondary effects from an outside disturbance to be transmitted back and forth along the train and escalate into an unmanageable variety of motions. Consequently the internal portion of a train when stabilized as I have described here is markedly insensitive to disturbances, no matter how long such a train may be.

The rolling and yawing velocities of the individual aircraft which occur as it is rotated by these actions back toward a straight alignment are damped by damping in roll snubbing the dihedral action, and damping due to the fish-tailing of the vertical tail (or an equivalent artificial action) snubbing the yawing velocity. Similarly, pitching velocities are snubbed by the horizontal fish-tailing of the horizontal tail, and the rising and falling, or "plunging" of any aircraft in the train is snubbed by changes of angle of attack which increase lift during descent and decrease it during ascent. Accordingly, snubbing action accompanies every motion of any aircraft in the train relative to another, leading to internal dynamic stability as well as static stability, in a properly proportioned and balanced air train.

These results are accomplished by the stability characteristics which are already present on any well designed individual aircraft, its longitudinal stability, its directional stability, and its lateral stability or its dihedral effect, regardless of whether these actions are produced by conventional aerodynamic means, or by powered electronic gyroscopic control systems.

It is to be particularly noted that no modification of any sort is made in the control system of the individual aircraft which compose the train in achieving the stability of the train.

Stability of the train is achieved simply and entirely by the manner in which the component aircraft are joined together.

In FIGURE 24 a variety of stability and control situations is shown diagrammatically. All of these and all others of a like nature which can occur are stabilized as described by the actions of axis 7 and axis 12, acting either independently or in combination.

In FIGURES 24A through 24M, and in FIGURES 22 and 23 the flight direction is from top to bottom of the sheet parallel to its vertical edge, for the plan-view figures, and perpendicularly out of the paper for the front view figures. FIGURES 22 and 23 illustrate the general case of the angularly displaced aircraft, attached to the train at one tip or the other or internally. A yawing couple 99T and a rolling couple 99D always act to straighten the line of the group. FIGURES 24A through 24M are particular examples of this general action. FIGURES 24A and 24B show the tipmost airplane in a train displaced above and behind the line of the train as if by an upgust, being rotated back toward the line of the train. FIGURES 24C and 24D show an airplane in the mid-length region of a train displaced above and behind the train as if by an upgust, being forced back down and forward by balanced couples on the two airplanes attached at its wing tips. FIGURES 24E and 24F show two airplanes adjacent to the free tip of a train angularly displaced in opposite directions as if by an upgust at the joint between planes. Here, as in the case just described, the corrective couples are equal and opposite and produce no net resultant on the train as a whole. The actions in downgusts are the same as with the upgusts just described but with the directions of the displacements and the corrective couples reversed.

FIGURES 24G, H, and I, paired with FIGURES 24J, K, and L, respectively, illustrate diagrammatically the sequence of the stability action by which a yawed and banked train comes to a non-yawed level position. Corrective yawing and rolling couples act initially on all airplanes (not shown). The tipmost airplanes are relatively least restrained and move first (G and J), followed by the airplanes next inboard (H and K), until the entire train is at an attitude of zero yaw and bank. The diagrams are simplified for clarity; actually the airplanes move gradually and progressively and are disposed along gently curving lines. The action in FIGURES 24G, H, and I, is the counterpart of the action of directional stability in an individual airplane, and in FIGURES 24J, K, and L, is the counterpart of the action of wing dihedral in the individual airplane. In the train these actions are always unified by the action of axis 7 producing powerful results.

A controlled turn may be made by an increase of thrust and the use of nose-up elevator on the tip plane on the outside of the turn, and by a reduction of thrust and the use of nose-down elevator on the tip plane on the inside of the turn, to get into the turn, followed by the same controls in the opposite sense to get out of the turn. With long trains such maneuvers should be performed slowly to avoid large differences of flight speed between the two extremities of the train and to avoid building up unnecessary angular momentum of the train as a whole, since there is relatively little natural damping against such motion.

A structurally stiff geometric plane runs through the length of the air train of this invention situated in a position sloping upward and forward. This is the plane in which the tipmost airplanes apply the resultant forces to start or stop the controlled turn. The airplane on one tip increases thrust and lift; the resultant direction of the force change is forward and upward, and is in or near the stiff plane, so that the action is transmitted spanwise through relatively stiff structure. The plane on the other tip decreases thrust and lift; the resultant of the force change is directed rearward and downward, and is also in or near the stiff plane. When these directions are all reversed to stop the turn, the action still lies in or near the stiff plane.

FIGURE 24M illustrates the action of axis 12 and horizontal tail 11, producing nose-down response to upgusts and nose-up response to downgusts, always in directions to alleviate the effects of the gusts. The location and direction of the gusts are indicated by the arrow. This action occurs in combination with the yawing-rolling stability actions previously described. An upgust may exert its greatest force on one plane locally; that plane rises some, is nosed down some, and is forced back into line by its yawed neighbors. One portion of a train may be nosed-up and another portion may be nosed-down for appreciable intervals of time, in accomplishing an alleviating adjustment to large convective clouds containing both upcurrents and down currents, by means of these combined actions.

For climbing and descending the control of the train is like the control of an individual airplane; all airplanes are controlled alike, by thrust changes or elevator changes or both.

The unified flight behavior of the air train, as described, can be seen to be completely general, producing stability of the individual airplanes within the train relative to each other, stability of the train as a whole along its flight path, and control of the train by piloting.

The stability and control of the laterally disposed subsonic air train as described above has been demonstrated by model glider tests, in both short and long trains, with axes 7 and 12 varying in restraint, and with positions of these axes varying as described herein, in smooth air and through severe gusts. Full success was obtained with wide margins to spare for design variations.

It is obvious from the foregoing descriptions that relative motion between adjacent aircraft can occur around axis 7 without any motion occurring around axis 12 (see FIGURES 20, 22, 23, and 24A–24L) or around axis 12 without any motion occurring around axis 7 (see FIGURES 21 and 24M). The effect of axis 7 occurs even though axis 12 is locked rigidly, and the effect of axis 12 occurs with axis 7 locked rigidly. Such locking, however, is not necessary as each axis acts independently when both are free, as will be apparent from a study of the drawing.

In certain aircraft designs employing this invention the action of axis 7 alone may be sufficient to achieve desired results. In other designs, the action of axis 12 alone may be sufficient. In such cases the construction shown in the drawing may be modified by obvious design methods to eliminate the axis of rotation which is not needed. This might be done, for example, to save weight, reduce cost, simplify structure, facilitate analysis, or for any of numerous useful reasons.

For example, in FIGURES 27 and 28, axis 7 is eliminated and axis 12 is kept operative by attaching hinge fitting 106 rigidly to T bar 103, forming a single integral piece. Or, to eliminate axis 12 and keep axis 7 operative, bearing 105 would be attached rigidly to T bar 103, with fitting 106 remaining free.

In the construction of FIGURES 3, 4, 5, 7, and 8, axis 7 is eliminated by the rigid attachment of tip housing 95 to wing tip 15. Alternatively axis 12 is eliminated by replacing rollers 5A and 5B with blocks fitting the same space but having square non-rolling non-skidding cross sections instead of circular cross sections.

It is obvious that much simpler single axis joints than these may be designed. It is the purpose of the drawing to disclose construction performing all functions simultaneously, therefore having both axis 7 and axis 12 operative and cooperating with means for attachment during flight. Simpler versions are then apparent to one skilled in the art.

This invention offers inherent structural weight saving advantages.

No matter how many aircraft structures are attached in a train to achieve any desired train length, the empty weight of the train per unit wing area does not increase. In conventional airplane design, by contrast, aspect ratios greater than about 12 are not used because of structural weight penalties, or aero-elastic difficulties, or control difficulties, which cannot be avoided, none of which exist in the air train.

The individual airplane of the air train may be of low aspect ratio light weight design. Allowing for the weight due to wing tip mechanisms, it is much lighter than a conventional high aspect ratio airplane of the same wing area, and this light weight per unit area (when empty) determines the correspondingly greater useful load per unit wing area which may be carried by the air train, for a comparable wing loading. The wings are relatively broad and stubby and are naturally strong when simply designed to preserve their external form, and all internal volumes are relatively deep and broad and consequently have a high ratio of internal volume per unit of external surface area, resulting in light weight and small skin friction per unit of internal volume.

In the ultimate form of the air train weight and lift forces in steady flight may be ideally balanced against each other at every point in the train, eliminating all bending moments and shears in flight, so that structural requirements in flight would arise only from the non-uniformity of gusts. In the real situation with any air train, the atmospheric gust which is sufficiently strong to be of significance to structural design (excluding tornadoes, which can be avoided) will be sufficiently large to spread its effect over more than one individual aircraft. The mass of the air train is similarly spread out in a series of fuselages and weight-bearing wing panels, so that bending moments and shears are small compared to the structure available to carry them.

This invention puts existing structure to work usefully where it already exists for other reasons. Bendable and twistable joint structure between adjacent aircraft structures are ordinarily not free of all mechanical or elastic restraint. Rotation around axis 7 may be unrestrained and nearly frictionless in some designs, while in others, in which ample margins of bending strength are present in the minimum structure, appreciable spring restraint may be usefully provided.

One stiff structural plane, stiff in bending, extends from tip to tip of the train, oriented in a direction in which externally applied loads are light, sloping upward and forward. A stiff plane in this position has a greater beam depth than does a vertical plane. Only a portion of the total normal bending moment in the wing is transmitted across the joint between adjacent aircraft structures. The bending moment is resolved into two components at the joint, one component lying in the stiff plane and one component lying perpendicular to the stiff plane. The perpendicular component produces aircraft rotation around axis 7, and is balanced out by aerodynamic couples 99T and 99D as described and does not cross the joint (or may be balanced out in part by elastic moments across the joint in which case this portion of the moments *is* transmitted across the joint). The component in the stiff plane passes across into the structure of the adjacent wing where it is once again resolved into components, one component lying in the stiff edgewise plane of the wing and one component lying normal to this. If a free pivot is used at axis 7 and if the angle of incidence of 7 is 39° above the horizontal, the local normal bending moment in the wing is reduced to 0.4 of its original value in crossing the joint, and the total bending moment is reduced to 0.63 of the original normal bending moment. Greater reductions are achieved when angles smaller than 39° are used for axis 7.

The choice of the angle of incidence for axis 7 is determined by optimization of structural and aerodynamic considerations.

Even in the stiff plane between adjacent aircraft structures a small degree of structural softness is sometimes usefully provided. This is shown in the detailed structure described below, by the resilient mounting of engagement rod 2, and the resilient construction of bearing rollers 5 and bearing pads 6. This slight resilience is not enough to have a significant effect on the stability functions of axis 7 previously described, and it permits the bending moments in the stiff plane to be relieved by dynamic reactions of the masses closest to the source of disturbance, rather than by masses more distant along the wing span. This resilience also provides a small amount of endwise softness in the air train structure, and thereby prevents appreciable compression and tension reactions in the joints accompanying the slight lengthening and shortening of the train due to rolling and yawing displacements of the individual aircraft. (This lengthening and shortening is not great, because all angular displacements across the joints are always kept small.)

The presence of a small amount of endwise resilience in the joint also permits the train to be trimmed slightly out of a straight line for special purposes, without producing yaw in the individual airplanes. It is advantageous structurally to trim the subsonic air train with the free tips sagging slightly, thereby placing the mid-length of the train in string-like tension, relieving all compressive stresses. For emergency purposes, if the bending moments across the stiff plane of any joint becomes excessive, and structural damage becomes possible, the joint separates, as will be described. In these circumstances it is desirable that the train be trimmed sagging at its tips so that when a joint parts the two portions of the train will spread apart safely, to rejoin again later in smoother air.

The in-flight engagement operation of the air train may be understood in detail by reference to the specific structure described below and shown in FIGURES 3 through 14, supplemented by the action diagrams in FIGURES 15 through 18.

The individual airplanes which form the train take off in succession so timed to attach into a train headed toward the destination, as quickly as possible. Since there is no necessity for a pilot to be carried in each airplane, two of the airplanes carrying radio control pilots and transmitting equipment take positions in easy view of the successive engagement operations, controlling these operations, starting near the center of the train and proceeding outwardly, one to the left and one to the right as the train grows, aligning the successive planes visually and starting each automatic engagement operation by radio control.

The automatic engagement operation is described below as airplane 1A attaches its wing tip 15 to wing tip 16 of airplane 1B, at the right tip of the train. It will be apparent from this description how an attachment may be made at the left tip of the train.

Airplane 1A is flown to a position approximately abreast of and on the same level as airplane 1B with about a wing chord length separating wing tips 15 and 16. Vertical and fore and aft positions are easily observed, using lights when necessary. The lateral separation is easily observed by a radio control pilot. When the operation is performed by a pilot aboard one of the planes the lateral separation is readily sensed, after experience, by changes of aileron and elevator control force required to keep airplanes 1A and 1B on a level line as lateral separation decreases and lift builds up on wing tips 15 and 16.

The engagement operation consists of three successive phases, engagement, drawing together, and locking. The sequence is begun by the radio control pilot or the pilot of airplane 1A operating a switch, not shown, starting motor 17 in wing tip 15. Motor 17 is an electric motor having speed torque characteristics typical of a series motor, that is, strong torque at slow speed, and high speed at light torque, and having a quickly reversible drive between armature and output shaft, initially driving friction drive spindle 18 in a direction to drive engagement rod 2 from wing tip 15 outward toward wing tip 16. Rollers 19 co-operate mechanically with spindle 18 exerting pressure on rod 2 to assure a positive frictional drive up to the maximum value of steady drive torque required by design during a normal attachment operation to draw the two airplanes together, but permitting spindle 18 to slip briefly on rod 2 in relief of sudden severe jerking loads due to air turbulence or due to sudden reversal of rotation of spindle 18, and to do so without damage to any structure. Other rollers and rod-guiding members not shown guide rod 2 in a straight lengthwise motion inboard and outboard within wing tip 15.

When rod 2 is nearly fully extended and has not come in contact with wing tip 16, stud 20 near the inboard end of rod 2 (FIGURE 3) operates resiliently mounted limit switch 21, reversing spindle 18, causing rod 2 to retract. When rod 2 is fully retracted, stud 20 operates resiliently mounted limit switch 22, again reversing spindle 18 and again causing rod 2 to extend. By these means head 23 on the outboard end of rod 2 oscillates in and out in the space outboard of wing tip 15, probing for the engagement parts on wing tip 16. If probing head 23 encounters no obstacle it continues to oscillate; if it strikes a bluff surface such as the squared off end of wing tip 16, its motion is limited and reversed. Resiliently mounted microswitch 24 at the outer extermity of head 23 reverses spindle 18 causing rod 2 to retract. (Switches 21, 22, and 24 are resiliently mounted to permit rod 2 to continue to move a short distance due to its momentum after the switches operate and before its motion is reversed, avoiding impact stresses.)

If head 23 strikes a sloping surface such as the inner surface of engagement guide cone 3 on wing tip 16, indicated diagrammatically by dash line 25 in FIGURE 11, it continues to extend, since microswitch 24 is not touched. The driving force of motor 17 guides head 23 into apex chamber 26 in guide cone 3, resiliently guiding wing tips 15 and 16 into improved alignment, with rod 3 providing the resiliency by bending somewhat. It is to be observed that rod 3 is relatively flexible when extended far, with the wing tips widely separated, and is relatively stiff when it engages cone 3 close at hand, so that it exerts relatively greater force on cone 3 for improving alignment when wing tip 16 is closer to wing tip 15 and the need for final alignment is greater.

FIGURE 15 illustrates diagrammatically the oscillating engagement action of rod 2. The wavy dotted line between wing tips 15 and 16 in FIGURE 15 represents the path in space traced by the tip of head 23 of attachment rod 2 during an engagement phase.

When head 23 is guided full depth into chamber 26, latch 27 on head 23 is guided into a tapered groove in chamber 26, not shown, guided in torsional alignment by flat surfaces 28 on head 23 which fit in a mating channel in chamber 26. If airplanes 1A and 1B are not at the same angles of attack this action twists rod 2 as a torsionally flexible spring. Airplane 1A and airplane 1B grasp each other when latch 27 on head 23 snaps past pawl 29 (FIGURE 8). Microswitch 24 strikes the closed bluff end of chamber 26, motor 17 starts the retraction of rod 2, latch 27 engages pawl 29 and cannot pass, and airplanes 1A and 1B are pulled toward each other as motor 17 continues to retract rod 2.

At this point the engagement phase is completed and the drawing-together phase commences, employing tension means, specifically rod 2, which is retracted.

If wing tips 15 and 16 are in accurate alignment, dome 4 enters cone 3 centrally as rod 2 retracts until the wing tips are snugly and squarely together. If wing tips 15 and 16 are not in accurate alignment, rod 2 will be bent, displacing its tip end forward, rearward, upward, or downward, depending on the direction of misalignment, exerting forces in corresponding directions on wing tip 15 and in opposite directions on wing tip 16, forcing both wing tips toward true alignment. If the misalignment is large, rod 2 will bear on lip 30 of dome 4, stiffening its bending resistance by shortening its unsupported length. Otherwise, rod 2 is unsupported outboard of clamp 31, which doubles in duty as a rod-guiding member when open. Lip 30 is thickened to provide adequate surface area on which to bear. As rod 2 retracts, its bending stiffness increases further, due to further shortening, and the forces acting to produce alignment increase correspondingly. As the wing tips are drawn still closer together, the tapered end of dome 4 enters cone 3, guiding the wing tips into positive final alignment.

The alignment actions just described are shown diagrammatically in FIGURES 16, 17, and 18. In these figures, the gap-closing, form-preserving, motion-permitting functions of tip housing 95 and aerodynamic seal 98 are performed by flexible lip 112 attached to wing tip 15 and lying on the extended external aerodynamic contours of that wing tip.

When the wing tips are fully together the drawing-together phase ends and the locking phase takes place. The spherical surface of dome 4 comes into contact with the mating spherical surface of cone 3. These mating spherical surfaces are located tangent to phantom sphere 32 indicated on FIGURES 3, 7, 8, and 19. At this point microswitches 33A and 33B (FIGURE 8) are both closed, stopping motor 17 and starting motor 34 (FIGURE 9), which rotates gears 35 and 36, turning jack screw 37, raising nut 38 integral with which is stud 39, which rides in slot 40 on the end of clamp lever arm 41, which rotates around pin 42 and presses upper clamp jaw 43 firmly down on lower clamp jaw 44, pressing resilient upper jaw liner 45 down on resilient lower jaw liner 46, clamping rod 2 firmly in place within the jaws of clamp 31. Motor 34, jack screw 37, and related parts have conventional base and mounting fittings, not designated, some of which are omitted for clarity, and clamp lower jaw 44 has a rigid mounting base attached to the primary structure of wing tip 15. A conventional switch is also provided, not shown, which stops motor 34 when the clamping pressure reaction on the mountings of jack screw 37 reach design values, completing the locking phase of the attachment operation.

Rotatable means which are provided for rotation around axis 7 are pivot bolts 92 and 93 holding the rigid structure of airplane 1A to rollers 5A and 5B respectively which bear on (but in this function do not roll on) bearing pads 6A and 6B, attached to the rigid structure of airplane 1B. Rotation around axis 7 is permitted by the spherical form of the surfaces of dome 4 lying within cone 3. See FIGURES 3, 4, 5, 7, 8, and 19.

Rotatable means which are provided for rotation around axis 12 are rollers 5A and 5B *rolling* on bearing pads 6A and 6B, dome 4 rotating within cone 3, and rod 2 twisting.

Equivalent rotatable means of different design for rotation around axis 7 are pivot 103 and hinge 106 in FIGURE 27, and short strap 113 in FIGURE 30, when strap 113 is bent like a leaf spring. Rotatable means around axis 12 are torsion rod 103 in FIGURE 27 and strap 113 in FIGURE 30, when strap 113 is twisted like a torsion spring.

It may be clearly seen that no other significant rotations are possible except around axes 7 and 11 in any of these constructions.

Holding means holding airplane 1A to airplane 1B are rod 2, clamp jaws 31 and dome 4 and related parts, attached to the rigid structure of airplane 1A; latch 27 attached to rod 2; and pawl 29 and cone 3 and related parts attached to the rigid structure of airplane 1B. See FIGURES 3, 4, 5, 7, 8, 11, and 12. As may be seen, rod 2 holds airplane 1A against airplane 1B, and cone 3 and dome 4 hold the wing tips properly aligned together by preventing relative displacements perpendicular to rod 2.

The attachment mechanism permits release of the two aircraft 1A and 1B at any time, by the pilot of either aircraft or by radio control. Either latch 27 or pawl 29 (FIGURES 11 and 8 respectively) may be retracted and the joint will part freely by lateral separation of the two aircraft. This is accomplished conveniently by aileron control, by lowering the wing tip opposite to the wing tip at the joint, producing a lateral component of lift which initiates a peel-off maneuver which pulls the joint open and spreads the flight path of the departing airplane from the flight path of the train.

To retract pawl 29, reversible retraction motor 48, started by placing a control switch in the "release" position turns an internal nut and draws concentric jack screw 49 to the left as seen in FIGURE 8, drawing cam block 50 to the left along cam block guide 51, which is rigidly mounted to the structure of the wing tip. Cam block 50 also slides along cam surface 52 on pawl lever arm 53, raising the arm 53 against the pressure of pawl spring 54 around pin 55, which is pivoted in fitting 56 rigidly attached in wing tip 16. When pawl 29 is raised sufficiently by these means the joint between adjacent airplanes is free to open, and cannot be re-made until the process is reversed by placing the control switch in "ready to be engaged" position, drawing cam block 50 to the right and allowing spring 54 to move pawl 29 into the active position as shown in FIGURE 8, in which position latch 27 can snap past it to the left by compressing spring 54, but latch 27 cannot pass to the right unless it avoids pawl 29 by being retracted into head 23.

The pilot of airplane 1A may release at any time by operating his "release" switch, starting reversible latch retraction motor 57 in head 23 (FIGURE 11) turning an internal nut which drives concentric jack screw 58 to the left as seen in FIGURE 11 carrying cam pin 59 to the left, riding in slot 60 in the latch member, rotating the latch member down around pivot pin 61, pin 59 being guided by four guide members 62 rigidly mounted in head 23, forming guide slot 63 between them, so that pin 59 rides in slots 60 and 63 and forces latch 27 down into head 23, enabling head 23 to back out past pawl 29 (FIGURE 8). Latch 27 is designed short so that release can be accomplished quickly. Latch 27 is raised by the reverse process.

Suitable conventional limit switches are provided in the mechanisms described above for raising and lowering latch 27 and pawl 29.

From attachment head 23 (FIGURE 11) insulated wires 64 and 65 from motor 57 and microswitch 24 respectively pass internally in rod 2 (FIGURE 10) along two of the approximately triangular spaces bounded by two of tensile members 66 and external tube 67. Tensile members 66 which also serve as spring members are imbedded side by side inside tube 67 only in the portion of rod 2 from the position of clamp 31 when the wing tips are fully together, outboard to head 23. Only this outer portion of rod 2 is required to have great tensile strength; this is provided by four tensile members 66 bonded side by side by bonding material 68 within tube 67. As may be required by design for spring purposes during the drawing-together action, these members may extend somewhat further inboard.

Internal telescoping tube 69 is located inside the inboard end of tube 67 and is attached rigidly to the structure of the wing of aircraft 1A and its own inboard end. The function of tube 69 is to carry electrical contacts into tube 67 to make contact with wires 64 and 65, which, in the portion of tube 67 inboard of tensile spring members 66, are mounted on the inner wall of tube 67, suitably insulated from that tube wall and bare toward the inside for making sliding contact with conductors carried by tube 69.

Means are provided which are responsive to lengthwise stresses, for safety, as follows: At clamp 31, hole 47 (FIGURE 14) passes through upper jaw 43 and upper resilient jaw liner 45. Rigidly attached to the upper outboard side of hole 47 (the left side as seen in FIGURE 14) rigidly fixed to upper jaw 43, and thereby held in a rigid position relative to the fixed structure of wing tip 15, is electrical wire 70. Also extending upwardly in hole 47, attached only to the lower side of resilient jaw liner 45 is electrical wire 71. When great tension exists in rod 2 tensile members 66 pull outboard, to the left in FIGURE 14, causing resilient jaw liners 45 and 46 to deform in shear. The surface of 45 in contact with rod 2 displaces outboard, carrying wire 71 outboard with it, making electrical contact between wires 70 and 71 when, by design, the stress in rod 2 is just short of being destructive to aircraft structure. Contact between 70 and 71 starts motor 57 and releases the joint between planes as described above, acting as an automatic safeguard against loadings of unforeseen severity. This stress-responsive action may be supplemented in design by suitable warning lights and by the use of special long stroke resilient strut members (not shown) for flight test purposes, to give two separating aircraft initial impetus away from each other.

When wing tips 15 and 16 separate, microswitches 33A and 33B both take open positions, releasing clamp 31 and allowing motor 17 to resume its cycle retracting rod 2, drawing head 23 into dome 4, at which point stud 20 strikes limit switch 22, which in this sequence stops motor 17 and completes the operation.

Conventional electrical circuitry is provided to perform the various conventional electrical operations described above.

Head 23 on rod 2 has resiliently mounted microswitch 24 at its outer tip (FIGURE 11) attached rigidly in telescoping cap 72, resiliently displaceable lengthwise relative to rod 2 by means of deformable rubber button 73 cemented to switch 24 and to head 23, this construction having the motion-reversing function previously described.

When wing tips 15 and 16 come together, electrical contact 74 (FIGURE 3) rigidly attached in wing tip housing 95 and connected to wire 75 leading to the rigid structure of wing tip 15 bears on resiliently mounted electrical contact 76 connected to wire 77 in wing tip 16, making an electrical connection between aircraft 1A and aircraft 1B. Contact 76 is of ample size to be touched by contact 74 with the two wing tips in any of the various possible relative positions. Separation of the wing tips breaks the contact. Although only one simple electrical connection is shown, elaborate multiple electrical connections can be made in the same general manner.

When the wing tips are drawn together, fuel conveyance means become operative, as follows: Deformable nozzle 78 (FIGURE 6) mounted rigidly on axially resilient fuel line 79 and guided by flange 80 on wing tip housing 95, presses its deformable lip 81 firmly against the squared-off surface of wing tip 16 over the open end of fuel line 82 which is rigidly mounted by means of fitting 83 in the rigid structure of wing tip 16, these parts holding 82 being bonded together by bonding material 84, which is also used to obtain a smooth flat surface around the perimeter of fitting 83. Clearances and resiliency are provided between the parts attached to tip 15 and those attached to tip 16, to permit all relative motions required between the tips while maintaining coverage of 82 by 78, the latter maintaining pressure toward the former, as will be evident by consideration of the drawings. Fuel is conveyed from airplane 1B to airplane 1A by means of fuel pump 85 pumping fuel through the passageway consisting of fuel line 82, nozzle 78, and fuel line 79, into tank 89, with fuel pump 87 assisting thereby keeping the pressure low in line 79, with lip 81 pressing against fitting 83 to seal the joint against leakage. Also fuel may be transferred by means of fuel pump 88 and fuel line 90 from tank 89 in the left wing tip 15 of airplane 1A to tank 86 in the right wing tip 16 of airplane 1A. Or fuel may be transferred in the opposite direction using fuel pump 91. Fuel, by these means, may be conveyed either direction between airplanes 1A and 1B and in either direction within airplane 1A or 1B. Wing tip 16 of airplane 1A, not shown, is identical to wing tip 16 of airplane 1B, as shown, and wing tip 15 of 1B is identical to 15 of 1A.

When wing tips 15 and 16 are joined, contact is, of course, established between airplanes 1A and 1B in addition to the contact established earlier by the extendable and retractable means, rod 2. Axis 7 is formed by upper and lower resilient bearing rollers, 5A and 5B, respectively, attached to the rigid structure of wing tip 15 by pivot bolts 92 and 93 respectively, pressing firmly against upper and lower resilient bearing pads 6A and 6B respectively imbedded in the rigid structure of wing tip 16, in co-operation with dome 4 lying within cone 3. Axis 12 is formed by dome 4 turning on a spanwise axis within cone 3. Bending restraint around axis 7 and torsional restraint around axis 12 are provided by the bending and twisting of rod 2.

The primary bending restraint in the joint is caused by a long length of rod 2 being bent moderately. The restraint in the joint increases markedly when the deflection in bending becomes sufficient to cause rod 2 to bear on lip 30 of dome 4 (FIGURE 19). This is the secondary stage of restraint. Finally a third stage of restraint occurs; the joint becomes rigid after a further deflection when the conical end of dome 4 bears against the conical inner surface of cone 3, as shown in FIGURE 19.

Resilient material is used in rollers 5 and pads 6 to provide a small amount of spanwise resilience in the joint for trimming and structural reasons as previously described, and also to cushion the bumping which occurs on joining and to provide conveniently renewable wearing surfaces in the joint.

Wing tip housing 94 at the extremity of wing tip 16 is rigidly integral with the structure of wing tip 16 and serves as a streamlined aerodynamic form around cone 3, permitting the use of a cone of larger dimensions than could be submerged into an unenlarged wing tip, thereby producing a larger target for the engagement operation. Also a larger cone enlarges correspondingly the effective structural beam depth consisting of roller 5 bearing on pad 6 compressively and rod 2 carrying tension. Housing 94 also provides aerodynamic end-plate and flow-straightening action. It reduces induced drag somewhat and allows relatively more lift to be developed near an exposed tip without incurring as much drag penalty as otherwise. This is advantageous for trimming the tip airplanes in a train; it reduces the amount of fuel transfer needed to achieve optimum aerodynamic trim. Housing means 94 being enlarged as compared to the unaltered airfoil contour of wing tip 16 offers the advantage of large size described above, and permits the joint between planes to be mounted low on the wing tip, advantageously lowering axis 7 without reducing the effective dihedral angle significantly. The outer surface of tip body 94 forms a flat external face, affording a probe-motion limiting surface against which head 23 of rod 2 acts and reverses itself in its oscillatory probing for cone 3. See FIGURE 15.

Wing tip fairing housing 95 at the extremity of wing tip 15 has the same typical form and performs functions like those of housing 94, streamlining dome 4 instead of cone 3, and having a flat outer surface to match the flat surface of body 94 and to permit relative differences of aerodynamic angle of attack between the two tip housings without mechanical obstruction and without significantly impairing the aerodynamic form of the combined housings 94 and 95. Housing 95 additionally permits wing tip 15 to rotate through small angles around axis 7 relative to wing tip 16 and maintains a sealed joint. Housing 95 is pivoted as an single rigid body on bolts 92 and 93, and clearance is provided between it and the rigid structure of wing tip 15 through the design range of joint motions. Internal flexible fabric aerodynamic seal 98 is attached to 15 and to 95 around the airfoil contour of wing tip 15, preventing airflow through the gap there and avoiding aerodynamic drag due to this airflow. Aerodynamic fins 96 and 97 are thin vertical plates attached rigidly to the rear end of housing 95 closing the gap which would otherwise occur there when bodies 94 and 95 are at markedly different angles of attack.

The large flat end surfaces of housings 94 and 95 prevent inadvertent overlapping of wing tips during the piloted approach to the engagement operation, when approaching end-wise wing tip to wing tip, short of gross errors of misalignment which are not likely to occur.

The invention produces additional aerodynamic and structural advantages which are not brought out in the above recitation of detailed structure. The engagement mechanism permits aircraft 1A to approach aircraft 1B from the most favorable direction, from which visibility and control are best, coming abreast from the rear at the same level far enough beyond the wing tip to avoid disturbances due to it. Attachment then occurs by the most reliable method, pulling the aircraft together by a single lateral tension force, incapable in itself of producing any yawing or pitching moment on either aircraft and producing no significant rolling moments. Rolling moments do occur, however, due to the aerodynamics of attachment, and these are put to good use by the mechanisms described; lift builds up on the tips as they approach, tending to lift the joint as it forms. This lifting action tends to roll the two airplanes away from each other, producing components of lift directed outwardly away from the joint, resisting the tension force in rod 2. This may be sufficient to stop the progress of the two aircraft toward each other temporarily. It opposes the build-up of momentum which would otherwise occur and prevents what would otherwise be a problem either of hard wing tip bumping or an additional piloting complication. With the mechanism described, the rate of closure is controllable by aileron action; by leveling his wings the pilot allows the closing operation to proceed and by allowing his free tip to sag he reduces or reverses the rate of closure.

During the engagement opration the flat strap-like form of rod 2 at a high angle of attack is stalled and remains stalled and is therefore not subjected to erratically varying lift and drag forces. The aeroelastic, structural, and aerodynamic form of rod 2 assures the success of several progressive phases of the attachment operation. When rod 2 is first engaged and is fully extended it acts primarily as a tension strap; the aircraft are flown to maintain tension by trimming slightly yawed away and rolled away from each other. When the aircraft are so trimmed tension alone produces a unified and stable flight system. If the airplanes lunge toward each other for any reason, rod 2 is protected against going slack or being buckled by the high speed retraction characteristics of motor 17 at light loads. Rod 2 then serves as a mechanical track along which wing tips 15 and 16 are guided toward each other. The effective stiffness of the track is increased by lip 30 on dome 4 which restrains rod 2 at wing tip 15 if it tends to buckle as a long column, and the fixity produced by head 23 restrained in chamber 26 of cone 3 is similarly beneficial.

As rod 2 retracts and becomes stiffer, it starts to transmit shear reactions between aircraft 1A and 1B in significant quantities. The strap-like form of rod 2 is relatively stiff in transmitting forces in its edgewise plane, which slopes upwardly and forwardly like axis 7 and is relatively soft at right angles to that plane. The important sheer reactions, then, occur upwardly and forwardly on one of the two wing tips and downwardly and rearwardly on the other wing tip. Such reactions produce rolling and yawing moments on both airplanes to bend their flight paths in the same direction, in a coordinated turn, and the sheer forces act to eliminate misalignment at the joining tips, as previously described.

As the retraction of rod 2 continues, the effect of its strap-like directional qualities in bending stiffness becomes more positive. This action forces bending in rod 2 to occur exactly as previously described for the short steel strap joint construction shown in FIGURE 30. Bending between airplane 1A and 1B must occur around axis 7, with this effect becoming progressively more positive and determinate as rod 2 shortens.

A form of rod 2 may be designed having free bending around axis 7 and stiffness in its stiff plane almost as great as that of the wing in which it retracts, so that substantially the full stabilizing action of axis 7 would be achieved during the entire engagement operation, if found to be desirable for further improvement of stability of the joining operation in very rough air. Such a construction, the details of which may easily be developed by any skilled engineer, is an obvious alternative to the construction covered in detail herein.

Significant aerodynamic and structural benefits are also achieved by fuel tanks 86 and 89, fuel pumps 85, 87, 88, and 91, and related fuel transfer parts. To achieve the minimum induced drag the air planes in the midspan portion of the air train must produce more lift and therefore must carry more weight than the airplanes at the free tips. Fuel is therefore conveyed from the tip airplanes to the central airplanes. Rolling moments are trimmed out on individual airplanes by shifting fuel laterally within each airplane, eliminating drag due to deflected ailerons. Induced drag is reduced to such a small value in the air train that such refinement becomes justified in that it produces significant changes in the drag which remains.

Fuel conveyance is significant further in that the construction described makes possible convenient aerial fueling from the wing tips to airborne gross weights greatly in excess of loadings which could be flown off the ground economically. Because of the distributed weight of the air train, loading in flight does not necessarily increase the structural weight requirements to any significant degree. As a result, immense airborne weights can be carried at low drag with small fuel consumption in light weight airplanes, unimpeded by the structural, aerodynamic, and power limitations which halt this process in conventional individual airplanes, making possible the carrying of substantial payload anywhere on earth and return to base without refueling, or continuous airborne operations lasting for many days.

When airplanes of adequate size form an air train, crew members, passengers, and goods may be conveyed from one airplane to another in flight, through suitable passageways and doors, not shown, in wing tips 15 and 16 and tip housings 94 and 95, opening adjacent to cone 3 and dome 4 where relative motions across the joint are small.

I have described one complete specific embodiment of the invention, a conservative form in which the operation of the invention is most readily understood and in which the advantages are most readily attained, in which all airplanes are especially designed for air train use and are identical. Airplanes modified from existing designs, and airplanes of varying design may also form trains, but it is preferable for reducing the rolling and yawing disturbances on the smaller airplanes that all airplanes have substantially equal wing spans and equal rolling moments of inertia. Otherwise, the smaller airplanes will tend to roll and yaw in an exaggerated manner.

It is to be understood that this invention has many specific forms coming within its broad scope. The airplanes may be of tailless design, to form an all-wing air train without fuselages or other drag-producing forms. The individual airplane for such a train would require means for directional, lateral, and longitudinal stability, accomplishing the same functions as the vertical tail, wing-dihedral angle, and horizontal tail. These stabilizing means as required for the individual aircraft would also function in the air train, as do their more conventional counterparts, as described herein.

Where in my specific examples I say "vertical tail" I mean in general for any case "directional stabilizing means"; where I say specifically "horizontal tail" I mean in general "longitudinal stabilizing means"; where I say "dihedral angle" I mean any "lateral stabilizing means" including a vertical tail or fin mounted high; where I say "wing tip" I mean "extremity" including extremities on a swept line or on a fore and aft line; where I say "spanwise" I mean "lengthwise," that is, along the general line of the train; where I say "induced drag" I also mean "shock drag," "aerodynamic heating," and "friction drag" because these forms of aerodynamic energy dissipation, like induced drag, can be reduced by the aerodynamic sheltering offered by formation into an air train; where I say "airplane" I mean all sorts of dynamically supported aircraft structures, and where I say "fuel conveyance from airplane to airplane" I mean in a broader sense "conveyance of useful load of all sorts through passageways interconnecting adjacent aircraft structures."

Specific embodiments of the invention for transonic, supersonic, and hypersonic flight, as indicated in FIGURE 29 will be the subjects of future patent applications.

I claim:

1. An air train comprising a multiplicity of discrete aerodynamically supported aircraft structures arranged serially, each of a plurality of said aircraft structures comprising linearly retractable protruding means for performing the discrete act of attaching during flight serially between two others of said aircraft structures, said aircraft structures sheltering each other aerodynamically whereby the dissipation of aerodynamic energy on the discrete aircraft structures is markedly reduced.

2. An air train comprising a plurality of discrete aerodynamically supported aircraft structures arranged serially, holding means holding one of said aircraft structures to another in serial array, said holding means co-operating with determinate rotatable means producing a determinate axis of relative rotation between said structures, said axis lying in an upwardly and forwardly inclined direction.

3. An air train comprising a plurality of discrete aerodynamically supported aircraft structures arranged serially, holding means holding one of said aircraft structures to another in serial array, said holding means co-operating with rotatable means producing only two determinate axes of relative rotation between said structures, one of said determinate axes lying in an upward and forward direction and the other of said determinate axes lying in a direction substantially horizontal and perpendicular to the flight direction of said air train.

4. An air train comprising a plurality of discrete aerodynamically supported aircraft structures arranged serially lifting surface to lifting surface, holding means holding one of said aircraft structures in contact with another in serial array, said holding means co-operating with determinate rotatable means producing a determinate axis of relative rotation between said aircraft structures, said determinate axis of rotation lying substantially horizontal and perpendicular to the flight direction of said air train said aircraft structures sheltering each other aerodynamically whereby the dissipation of aerodynamic energy on the discrete aircraft structures is markedly reduced.

5. In the air train of claim 4, flexible restraint means attached to said determinate rotatable means and attached to one of said aircraft structures flexibly restraining said structures in relative rotation around said axis of rotation.

6. In the air train of claim 4, an enlarged housing attached to said aircraft structure housing said holding means, said housing terminating in a flat external vertical face the plane of which lies parallel to the direction of flight.

7. An air train comprising a plurality of discrete aerodynamically supported aircraft structures arranged lengthwise serially, holding means holding one of said aircraft structures in contact with another in serial array, said contact being in addition to the contact through said holding means, said holding means co-operating with determinate rotatable means producing a determinate lengthwise axis of relative rotation between said aircraft structures said aircraft structures sheltering each other aerodynamically whereby the dissipation of aerodynamic energy on the discrete aircraft structures is markedly reduced.

8. An air train comprising a plurality of discrete aerodynamically supported aircraft structures arranged lengthwise serially, joint means attaching one of said aircraft structures to another in serial array, said joint means comprising substantially stiff structural means lying in a geometric plane extending lengthwise through said aircraft structures, said joint means co-operating with determinate rotatable means producing a determinate axis of relative rotation between said aircraft structures, said axis lying in an upward and forward direction.

9. An air train comprising a plurality of discrete aerodynamically supported aircraft structures arranged lengthwise serially, holding means holding one of said aircraft structures in contact with another in serial array, said holding means comprising substantially stiff structural means lying in a geometric plane extending through said aircraft structures, said holding means co-operating with rotatable means producing only two determinate axes of relative rotation between said aircraft structures, both of said determinate axes of rotation lying in said structurally stiff geometric plane.

10. An air train comprising a plurality of discrete aerodynamically supported aircraft structures arranged serially, each of said structures being initially in independent flight, said aircraft structures comprising means for performing the discrete act of attachment one to another in serial order in flight, said attachment means comprising tension means attached to one of said aircraft structures drawing said aircraft structures adjacent to each other in serial array in flight.

11. An air train comprising a plurality of individual aircraft initially in independent unattached flight, engagement means attached to one of said aircraft and co-operating in flight with other engagement means attached to another of said aircraft whereby said individual aircraft depart from independent flight and engage together in contact in unified flight, said engagement means comprising extendable and retractable means on one of said aircraft, said contact being in addition to the contact through said extendable and retractable means.

12. An air train comprising a plurality of discrete winged aircraft arranged wing tip to wing tip, said aircraft comprising means drawing said aircraft one to another in flight in a wing tip to wing tip position, said means comprising retracting tension means attached from the wing tip of a first aircraft to the wing tip of a second aircraft.

13. A train comprising a plurality of individual aerial craft initially in independent flight, engagement means attached to one of said aerial craft co-operating in flight with other engagement means attached to another of said aerial craft whereby said individual craft engage together in unified flight, said engagement means attached to one of said craft comprising extendable probe means, said probe means comprising probe-motion reversal means, said other engagement means comprising probe-motion limiting means, said probe-motion limiting means actuating said probe-motion reversal means, said probe means probing said other engagement means, whereby said engagement means engages said other engagement means.

14. In the train of claim 13, enlarged housing means attached to the other of said craft housing said other engagement means.

15. In the train of claim 14, said enlarged housing means comprising a flat vertical external face lying parallel to the direction of flight.

16. An air train in accordance with claim 2, said one of said aircraft structures comprising attachment means performing the discrete act of attaching said aircraft structure in said train in flight.

17. An air train in accordance with claim 16, said one of said aircraft structures comprising conveyance means conveying useful load from that aircraft structure into another of said aircraft structures.

18. An air train in accordance with claim 2, one of said aircraft structures comprising serially-acting flexible restraint means flexibly restraining said aircraft structure in rotation around said upwardly and forwardly inclined axis, said restraint means comprising primary restraint means and secondary restraint means, said primary restraint means acting initially in small deflections from neutral and having a relatively small spring rate, and said secondary restraint means acting at larger deflections from neutral and having a relatively large spring rate.

19. An air train as claimed in claim 11, said other engagement means comprising guiding and grasping means co-operating between said aircraft.

20. An air train in accordance with claim 9, one of said determinate axes sloping forward and upward and the other of said determinate axes lying lengthwise of said substantially stiff structural means.

21. An air train in accordance with claim 2, said aircraft structure comprising vertical tail surfaces attached to said structure in a position rearwardly and upwardly from said determinate axis of relative rotation.

22. An air train in accordance with claim 2, said aircraft structure comprising wing means, said wing means incorporating effective dihedral angle.

23. An air train in accordance with claim 13, said other engagement means comprising guiding and grasping means.

24. An air train comprising a plurality of discrete aerodynamically supported aircraft structures arranged serially, a strap-like member holding one of said aircraft to another, a vertical cross section in the direction of flight through said strap-like member, taken at a position between said aircraft structures, being relatively long in the upward-forward direction and relatively short in the upward-rearward direction.

25. A multiple aircraft comprising a plurality of individual winged aircraft each capable of independent flight, securing means attached to the wing tips of said individual aircraft, said individual aircraft secured to one another in a wing tip to wing tip arrangement by said securing means, said secured securing means comprising determinate rotatable axis means, said determinate rotatable axis means comprising spanwise pivotal axis means permitting said individual aircraft to assume different angles of attack.

26. An air train comprising a plurality of discrete aerodynamically supported aircraft structures arranged lengthwise serially wing tip to wing tip, deformable joint means joining one of said structures to another at the wing tips, said joint means being deformable lengthwise in response to lengthwise stresses transmitted from one of said aircraft structures to another, said deformable joint means comprising resilient means elastically restraining such lengthwise deformation, joint release means attached to said deformable joint means and to one of said aircraft structures, and stress-responsive means co-operating with said deformable joint means operating said joint release means releasing one of said aircraft structures from another in flight.

References Cited by the Examiner

UNITED STATES PATENTS

| 1,818,138 | 8/1931 | Howland | 244—3 |
|---|---|---|---|
| 1,977,198 | 10/1934 | Nicolson | 244—1 |
| 2,421,742 | 5/1947 | Buettner | 244—2 |
| 2,496,087 | 1/1950 | Fleming | 244—2 |
| 2,692,121 | 10/1954 | Brown | 244—3 |
| 2,809,792 | 9/1957 | Hohmann | 244—3 |
| 2,863,618 | 12/1958 | Doyle et al. | 244—2 |
| 2,883,125 | 4/1959 | Jarvis et al. | 244—2 |
| 2,953,332 | 9/1960 | Cobham et al. | 244—135 |
| 2,969,933 | 1/1961 | Vogt | 244—2 |
| 3,161,373 | 12/1964 | Vogt | 244—2 |

FOREIGN PATENTS

| 600,477 | 4/1948 | Great Britain. |
|---|---|---|
| 297,992 | 5/1932 | Italy. |

MILTON BUCHLER, *Primary Examiner.*

FERGUS S. MIDDLETON, *Examiner.*

R. G. BESHA, A. E. CORRIGAN, *Assistant Examiners.*